(12) United States Patent
Palmer et al.

(10) Patent No.: US 6,577,324 B1
(45) Date of Patent: Jun. 10, 2003

(54) VIDEO AND AUDIO MULTIMEDIA POP-UP DOCUMENTATION BY PERFORMING SELECTED FUNCTIONS ON SELECTED TOPICS

(75) Inventors: Ricky S. Palmer, Nashua, NH (US); Larry G. Palmer, Nashua, NH (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 08/479,569

(22) Filed: Jun. 7, 1995

Related U.S. Application Data

(63) Continuation of application No. 07/915,082, filed on Jul. 16, 1992, now abandoned, which is a continuation-in-part of application No. 07/893,074, filed on Jun. 3, 1992, now Pat. No. 5,375,068, and a continuation-in-part of application No. 07/893,234, filed on Jun. 3, 1992, now abandoned, application No. 08/479,569, which is a continuation-in-part of application No. 07/915,088, filed on Jul. 16, 1992, now Pat. No. 5,623,690, and a continuation-in-part of application No. 07/915,087, filed on Jul. 16, 1992, now Pat. No. 5,475,421.

(51) Int. Cl.[7] .............................................. G06F 3/00
(52) U.S. Cl. ....................... 345/705; 345/716; 345/753; 707/500.1
(58) Field of Search ................................. 395/153–154, 395/330, 806; 434/308–309, 316; 358/402, 343, 515; 384/423; 360/19.1; 364/514 A

(56) References Cited

U.S. PATENT DOCUMENTS

| | | |
|---|---|---|
| 3,584,142 A | 6/1971 | Schoeffler .................. 178/6.8 |
| 4,387,271 A | 6/1983 | Artom ...................... 179/2 DP |
| 4,516,156 A | 5/1985 | Fabris et al. ................. 358/85 |

(List continued on next page.)

OTHER PUBLICATIONS

Ludwig, Integration of CAD/CAE with Multimedic Teleconferencing Via Broadband Networks & Shared Resource Servers, IEEE Systems Integration '90 Conf Proc. 5/90, p. 136–143.*

Tanigawa et al, Personal Multimedia Multipoint Teleconference System, IEEE INFOCOM '91 Conf Proc., 3/91, p. 1127–1134.*

Ramanathan et al, Integrating Virtual Reality, IEEE Transactions On Consumer Electronics, 5/92, p. 70–76.*

Lake et al, Network Environment for Studying Multimedia Network Architecture & Control, IEEE GLOBECOM '89 Conf Proc, 3/89, p. 1232–1236.*

Microsoft, Windows User Manual, 1990, p. 70–73.*

Stokell, Windows & OS/2 Expo, Newsbytes, Jan. 30, 1992.*

Microsoft, Windows 3.1 User Manual, 1991, p. 42–45.*

Palmer and Palmer, "Desktop Meeting", LAN Magazine, 6(11):111–121 (Nov. 1991).

D. Comer, "Internetworking with TCP/IP, vol. I: Principles, Protocols, and Architecture", 2nd Edition, pp. 1–8, 337–346, 505 (Prentice Hall: Englewood Cliffs, New Jersey 1991).

WordPerfect Manual, Version 5.1, pp. 299–302, *WordPerfect© Corporation, 1555 N. Technology Way, Orem, Utah 84057 (1990).*

*Primary Examiner*—John Breene
(74) *Attorney, Agent, or Firm*—Hamilton, Brook, Smith & Reynolds, P.C.

(57) ABSTRACT

An audiovisual help documentation system for applications running on a multimedia computer workstation or personal computer includes a graphical documentation interface which allows a user to easily access audiovisual or textual documentation related to the application. A pop-up menu model is used to eliminate complexity. Textual and audiovisual "filmclip" documentation are stored in separate subject-specific files. The documentation menu includes a topic field for indicating a topic for which documentation is available, and a user selectable function associated with the topic field. The topic field is associated with a multimedia data file storing audio and video data streams representing the audio and video documentation for that topic. The documentation menu also includes a user selectable function associated with the topic field for retrieving text related to the associated topic. A "talking pushbutton" fast help feature can also playback a "sound clip" to the user which briefly describes a selected user function.

28 Claims, 33 Drawing Sheets

U.S. PATENT DOCUMENTS

| | | | |
|---|---|---|---|
| 4,525,779 A | | 6/1985 | Davids et al. ............... 364/200 |
| 4,574,374 A | | 3/1986 | Scordo ........................ 370/62 |
| 4,645,872 A | | 2/1987 | Pressman et al. ............. 379/54 |
| 4,650,929 A | | 3/1987 | Boerger et al. ............... 358/86 |
| 4,653,090 A | | 3/1987 | Hayden ...................... 379/204 |
| 4,686,698 A | | 8/1987 | Tompkins et al. ............ 379/53 |
| 4,710,917 A | | 12/1987 | Tompkins et al. ............ 370/62 |
| 4,734,765 A | | 3/1988 | Okada et al. ................ 358/102 |
| 4,827,339 A | | 5/1989 | Wada et al. ................ 358/136 |
| 4,846,693 A | * | 7/1989 | Baer .......................... 434/308 |
| 4,847,829 A | | 7/1989 | Tompkins et al. ............ 370/62 |
| 4,849,811 A | | 7/1989 | Kleinerman ............... 358/133 |
| 4,882,743 A | | 11/1989 | Mahmoud .................... 379/53 |
| 4,884,972 A | * | 12/1989 | Gaspor .................. 395/154 X |
| 4,888,795 A | | 12/1989 | Ando et al. .................... 379/53 |
| 4,893,326 A | | 1/1990 | Duran et al. ................... 379/53 |
| 4,897,866 A | | 1/1990 | Majmudar et al. ............ 379/94 |
| 4,918,718 A | | 4/1990 | Emmons et al. .............. 379/53 |
| 4,924,311 A | | 5/1990 | Ohki et al. ................. 358/138 |
| 4,932,047 A | | 6/1990 | Emmons et al. .............. 379/53 |
| 4,935,953 A | | 6/1990 | Appel et al. ................... 379/53 |
| 4,939,595 A | * | 7/1990 | Yoshimoto et al. ........ 360/19.1 |
| 4,942,540 A | | 7/1990 | Black et al. ................ 364/514 |
| 4,943,994 A | | 7/1990 | Ohtsuka et al. ............... 379/53 |
| 4,953,159 A | | 8/1990 | Hayden et al. ............... 370/62 |
| 4,953,196 A | | 8/1990 | Ishikawa et al. .............. 379/53 |
| 4,962,521 A | | 10/1990 | Komatsu et al. .............. 379/53 |
| 4,965,819 A | | 10/1990 | Kannes ........................ 379/53 |
| 4,968,254 A | * | 11/1990 | Gangwere, Jr. et al.   434/309 X |
| 4,968,257 A | * | 11/1990 | Yalen ........................ 434/308 |
| 4,970,678 A | * | 11/1990 | Sladowski et al. .......... 395/275 |
| 4,992,972 A | * | 2/1991 | Brooks et al. ............... 395/155 |
| 4,995,071 A | | 2/1991 | Weber et al. .................. 379/53 |
| 4,996,707 A | * | 2/1991 | O'Malley et al. ....... 358/402 X |
| 5,003,532 A | | 3/1991 | Ashida et al. ................. 370/62 |
| 5,033,969 A | * | 7/1991 | Kamimura ............. 434/309 X |
| 5,034,916 A | | 7/1991 | Ordish ........................ 364/900 |
| 5,042,006 A | | 8/1991 | Flohrer ........................ 364/900 |
| 5,042,062 A | | 8/1991 | Lee et al. ...................... 379/54 |
| 5,046,079 A | | 9/1991 | Hashimoto ................... 379/53 |
| 5,046,080 A | | 9/1991 | Lee et al. ...................... 379/53 |
| 5,056,136 A | | 10/1991 | Smith .......................... 389/10 |
| 5,062,136 A | | 10/1991 | Gattis et al. .................. 380/18 |
| 5,072,442 A | | 12/1991 | Todd ........................... 370/62 |
| 5,079,627 A | | 1/1992 | Filo ............................. 358/85 |
| 5,099,510 A | | 3/1992 | Blinken, Jr. et al. ........ 379/202 |
| 5,109,482 A | * | 4/1992 | Bohrman .................... 395/154 |
| 5,179,651 A | * | 1/1993 | Taffe et al. .................. 395/154 |
| 5,204,947 A | * | 4/1993 | Bernstein et al. ........ 395/154 X |
| 5,208,745 A | * | 5/1993 | Quentin et al. ......... 395/154 X |
| 5,230,041 A | * | 7/1993 | Dinwiddle, Jr. et al.  395/154 X |
| 5,241,671 A | * | 8/1993 | Reed et al. .................. 395/600 |
| 5,262,964 A | * | 11/1993 | Bonsall et al. .......... 364/514 A |
| 5,287,448 A | * | 2/1994 | Nicol et al. .................. 395/159 |
| 5,307,456 A | * | 4/1994 | MacKay ..................... 395/154 |
| 5,396,338 A | * | 3/1995 | Sato et al. ................... 358/341 |
| 5,412,774 A | * | 5/1995 | Agrawal et al. ............. 395/157 |
| 5,430,835 A | * | 7/1995 | Williams et al. ............. 395/154 |
| 5,442,771 A | * | 8/1995 | Filepp et al. ................. 395/650 |
| 5,448,727 A | * | 9/1995 | Annevelink ................. 395/600 |
| 5,587,979 A | * | 12/1996 | Bluthgen ..................... 369/32 |

\* cited by examiner

A calls B, B answers

A calls C, C answers

B calls C or A joins B and C

START

| 01010100 = 0x54 | 01010011 = 0x53 |

Total length = 2 bytes

| 01001011 = 0x4B | 01001111 = 0x4F |

Total length = 2 bytes

FIG. 9

STARTHEADER 5 reserved longwords (32 bits each)

| framerate desired (longword) | ←406 |
| DTP flags | ←412 |

2 reserved longwords

| total number of frames | ←408 |

1 reserved longword

| video width | ←400 |
| video height | ←402 |
| bits per pixel (8 or 24) | ←404 |

35 reserved longwords

| 78 longwords (used as login/user handle) | ←410 |

FIG. 10

QUIT

| 01010100 = 0x54 | 01010001 = 0x51 |

Total length = 2 bytes

ANSWERMACHINE

| 01001101 = 0x4D | 01000001 = 0x41 |

Total length = 2 bytes

CONTROL 5 reserved longwords

Total length is 34 bytes

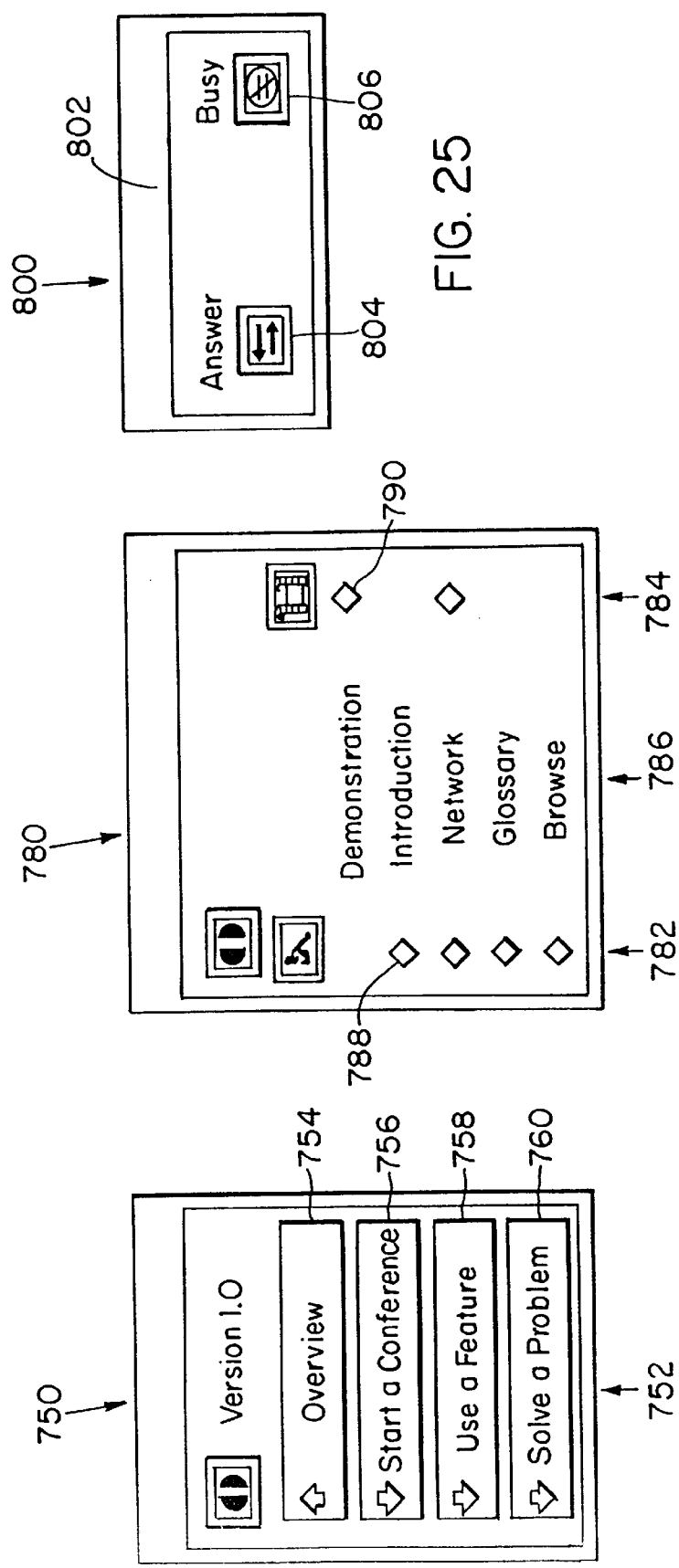

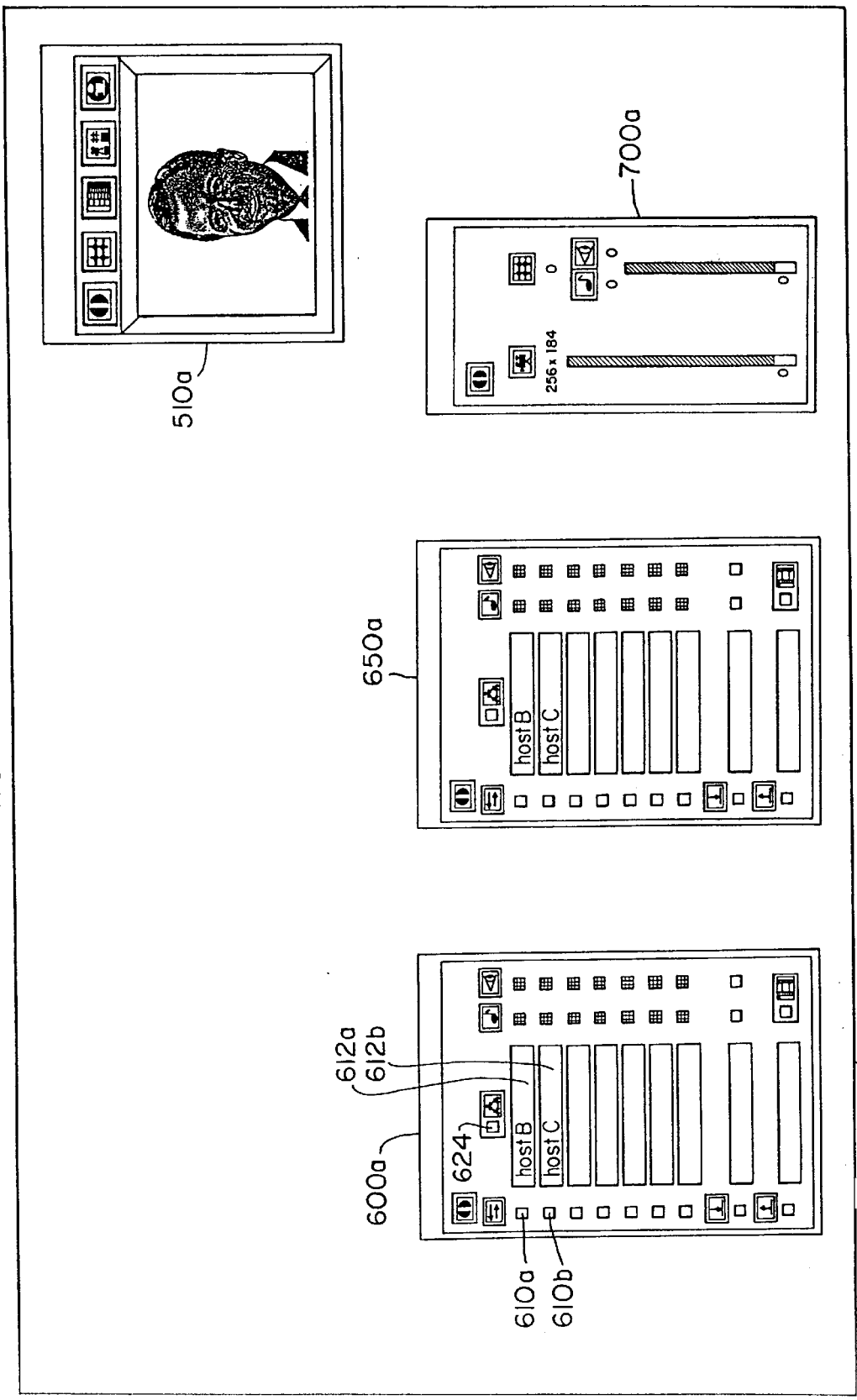

VIDEO AND AUDIO MULTIMEDIA POP-UP DOCUMENTATION BY PERFORMING SELECTED FUNCTIONS ON SELECTED TOPICS

RELATED APPLICATIONS

This application is a Continuation of U.S. application Ser. No. 07/915,082, filed Jul. 16, 1992 (now abandoned) which is a Continuation-in-Part of U.S. application Ser. No. 07/893,074, filed Jun. 3, 1992 (U.S. Pat. No. 5,375,068) and U.S. application Ser. No. 07/893,234, filed Jun. 3, 1992 (now abandoned). This application is also a continuation-in-part and U.S. application Ser. No. 07/915,088, filed Jul. 16, 1992 (U.S. Pat. No. 5,623,690) and U.S. application Ser. No. 07/915,087, filed Jul. 16, 1992 (U.S. Pat. No. 5,475,421).

BACKGROUND OF THE INVENTION

On line "help" documentation for applications running on a computer workstation or personal computer have become a popular means for providing instantly accessible information about the application to the user. Typically, the user activates a help function which allows the user to further inquire about the operation or features of the application. Textual documentation about the selected operation or feature is then presented to the user on the computer display.

Video communications has evolved over the years from a simple video telephone concept to a sophisticated network for allowing multiple users to participate in a video teleconference. For full featured video teleconferencing, users require both an audio communications path and a real time visual communication path synchronized to the audio path. Furthermore, it is desirable to support full color video and telephone quality audio. Video teleconferencing capabilities are limited mainly by the bandwidth of the transmission medium connecting the teleconferencing terminals.

Many computer workstations used in the office or laboratory environment today are connected with other workstations, file servers, or other resources over high-speed local area networks. Local area networks, in turn, are often connected together through high-speed gateways which connect workstations which may be distributed over a wide geographic area. Network wide protocols allow workstations to exchange packets of data at high rates of speed and reliability. Fixed bandwidth digital and analog video channels have been combined with computer networks to implement some video teleconferencing features. These include high bandwidth CATV/FDM type analog channels and fixed allocation TDM data channels for the video data.

SUMMARY OF THE INVENTION

Workstations today have obtained unprecedented computational power and utility. The powerful RISC type CPUs and fast, high resolution graphical displays have made possible multimedia workstations which integrate live audio and video into the programming environment. Graphical User Interface operating systems (GUI) have allowed effective integration of audio and video into application programming.

The present invention provides audiovisual help documentation for applications running on a multimedia computer workstation or personal computer. In a preferred embodiment the invention provides audiovisual documentation for an n-way video teleconferencing application. A graphical documentation interface allows a user to easily access audiovisual or textual documentation related to learning and using the video teleconferencing features of the application. A pop-up menu model is used to eliminate the layered complexity often associated with pull-down menu models, and substantially reduces the number of keystrokes required to access documentation on a given topic. Textual and audiovisual "filmclip" documentation are stored in separate subject-specific files which allow the documentation to be easily internationalized on a subject by subject basis. International icons and easily recognizable graphics also help make the documentation interface understandable to a wide, multi-lingual audience of users. Furthermore, the invention provides a fast help feature in the form of "talking pushbuttons" for an application running on the multimedia workstation. When a fast help access key is selected along with a user selectable function of the application, an audio "sound clip" is played back to the user which briefly describes the function of the selected user function. Each user function of the application can be associated with a separate "sound clip" file which allows for easy revision and internationalization of the audio documentation.

In general, in one aspect, the invention features an apparatus providing audiovisual documentation on a multimedia computer workstation, including means for displaying a documentation menu on the workstation display. The documentation menu includes a topic field for indicating a topic for which documentation is available, and a user selectable function associated with the topic field. The apparatus also includes means for retrieval and playback of audiovisual "filmclip" documentation related to the associated topic upon activation of the user selectable function associated with the topic field. For instance, the documentation menu can be presented as a Motif pop-up window of a graphical user interface for an X Windows application such as video teleconferencing. The user selectable function can be represented as a graphical pushbutton associated with an application related topic. The graphical pushbutton can be activated with a graphical pointing device such as a mouse or a touch screen display.

In preferred embodiments of the invention, a topic field is associated with a multimedia data file storing audio and video data streams representing the audio and video documentation for that topic. Audio is stored in the multimedia data file as an audio data stream which can be retrieved and played back as a continuous audio signal. Each frame of video data stored in the multimedia data file is inserted into the audio data stream without affecting the continuity of the audio signal played back by the retrieval means.

In yet other preferred embodiments, timing information is attached to each stored frame of video data indicating a point in the audio data stream corresponding in time to the frame of video data. The retrieval means includes a synchronizer which displays a frame of video data when the point in the audio data stream corresponding to the timing information of the video frame is audibly reproduced by the workstation. The retrieval means also includes a timing generator for counting the amount of audio data in the audio stream retrieved from the multimedia data file. The synchronizer includes a comparator for comparing the timing generator count with the timing information stored in the data file corresponding to a frame of video data to determine when to display the video frame.

In yet other preferred embodiments, the documentation menu also includes a user selectable function associated with the topic field for retrieving text related to the associated topic.

In general, in another aspect, the invention features a graphical user interface for use with a video teleconferencing workstation. The graphical user interface includes means for displaying a video teleconference application window on the workstation display. The application window includes a video image area for displaying video information associated with the video teleconferencing session, and a control area for displaying one or more selectable video teleconferencing functions represented as graphical pushbuttons. The user selectable video teleconferencing functions include a video teleconference documentation function which when selected causes a documentation menu to be displayed on the workstation monitor providing video teleconference documentation to the user. The documentation menu includes a topic field for indicating a video teleconferencing topic for which documentation is available, and a user selectable function associated with the topic field. The apparatus also includes means for retrieval and playback of audiovisual "filmclip" documentation related to the associated topic upon activation of the user selectable function associated with the topic field.

In general, in yet another aspect, the invention features an audio documentation apparatus for applications running on a multimedia computer workstation having user selectable functions. The audio documentation apparatus includes means for activating an audio documentation function simultaneously with selection of a user selectable function. Audio retrieval means retrieve and playback audio documentation related to the selected user function when the user function and the audio documentation function are simultaneously selected.

In preferred embodiments, audio documentation is stored in a multimedia data file associated with each user function for with audio documentation is available. The audio documentation is stored as an audio data stream which can be retrieved from the multimedia data file and played back by the retrieval means as a continuous audio signal.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 8 illustrates the format of the START message of the teleconferencing protocol of this invention.

FIG. 9 illustrates the format of the OK message of the teleconferencing protocol of this invention.

FIG. 10 illustrates the format of the STARTHEADER message of the video teleconferencing protocol of this invention.

FIG. 23 shows a second level documentation graphical user interface window for obtaining information about the operation and features of a video teleconference of this invention.

FIG. 24 shows a third level documentation graphical user interface window for obtaining information about a topic selected from the second level user interface window of FIG. 23.

FIG. 25 shows a graphical user interface window of a ring box for announcing a video teleconference call to another workstation to establish a video teleconference of this invention.

FIGS. 26(a)–26(k) show the display screens of three Workstations participating in a three-way video teleconference of this invention.

DESCRIPTION OF THE PREFERRED EMBODIMENT

Figure 1:
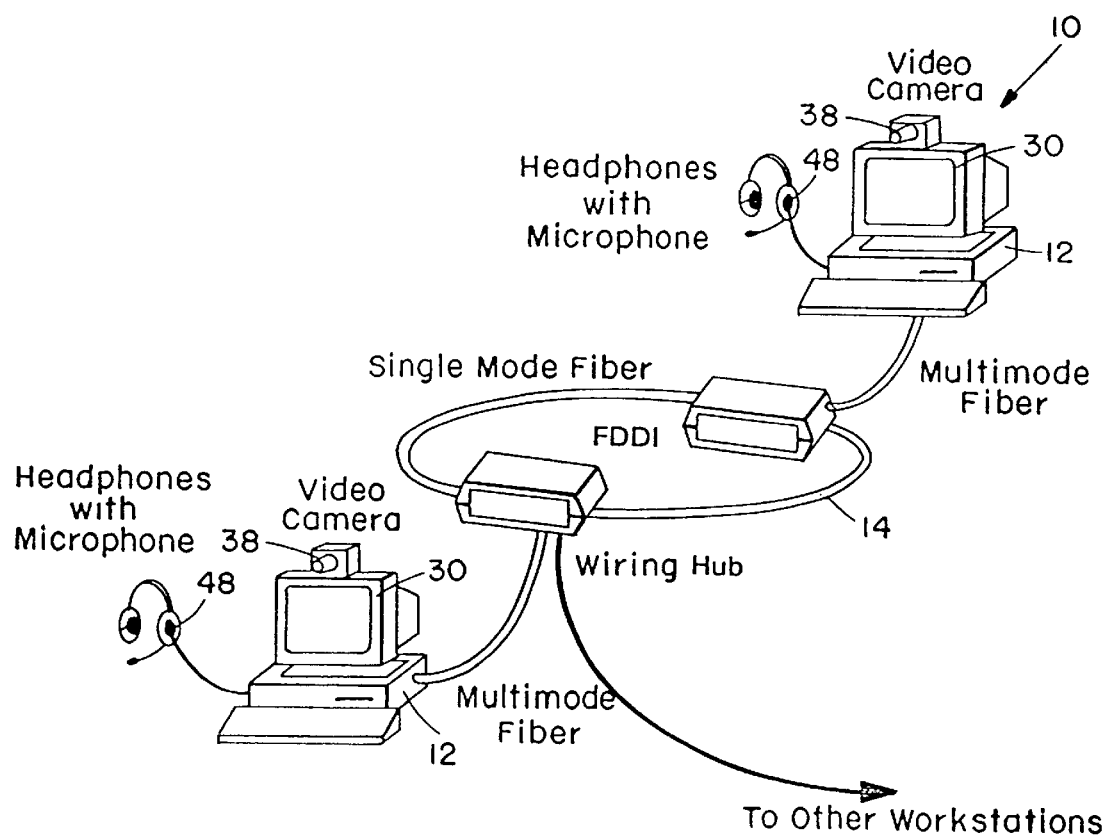
FIG. 1 is a pictorial representation of the distributed computer system featuring multimedia workstations having video teleconferencing capabilities of this invention.

FIG. 1 shows a distributed computer system 10, having a plurality of multimedia workstations 12 connected by a high speed digital network 14, which features n-way video teleconferencing of this invention. Each of the multimedia workstations 12 is capable of producing live audio and video data for transmission across the network to another multimedia workstation. Further, each of the multimedia workstations is capable of sonically reproducing the audio data and visually reproducing the video data received from another workstation.

Two or more of the networked workstations can participate in an n-way video teleconference using the teleconferencing protocol of this invention. The teleconferencing protocol of this invention allows real time synchronized audio and video transmission across the network without the use of a fixed bandwidth or dedicated time slot transmission medium. Rather, this invention provides high performance video teleconferencing features using standard digital network transport level protocols such as Internet TCP/IP and UDP/IP, or DECnet™. The physical network link 14 should be a high speed FDDI (Fiber Distributed Data Interface) fiber optic link running at 100 MB/Sec. for maximum performance (about 15 uncompressed black and white frames per second), but can also be virtually any type of high quality digital network link such as an Ethernet™. In the case of the FDDI network link, performance is typically limited by the workstation hardware and software, rather than by the throughput of the network. In addition, wide area networking (WAN) technologies, such as T1 and T3 digital carriers, can be used with the video teleconferencing protocol of this invention. These WAN technologies can be expected to achieve a video frame rate of at least about 12 Hz, assuming black and white video images compressed with JPEG, MPEG, or another video compression technique. The features of one preferred embodiment of this invention are commercially embodied in the DECspin™ product available from Digital Equipment Corporation, Maynard, Mass., the assignee of this patent application.

Figure 2:
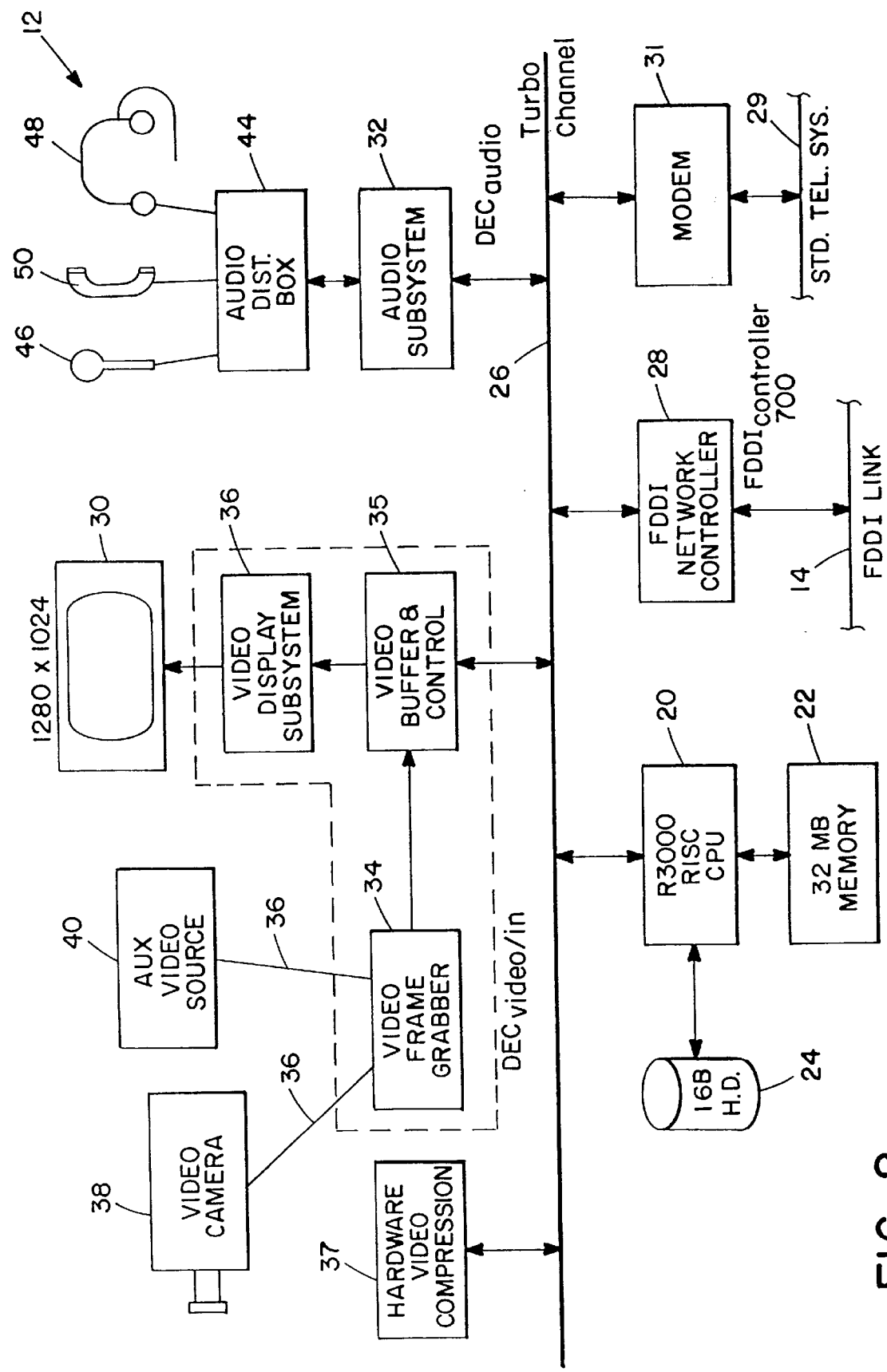
FIG. 2 is a block diagram showing a preferred embodiment of the multimedia workstation for implementing the video teleconferencing features of the distributor computer system of FIG. 1.

FIG. 2 shows a preferred embodiment of the multimedia workstation 12 for implementing the video teleconferencing protocol of this invention. Workstation 12 includes a high performance processor 20 connected to a large working memory 22 having 24 megabytes or more capacity, and a large hard drive having 1 gigabytes or more capacity. A high performance backplane channel 26 connects the processor, memory, and hard disk to other devices in the workstation.

The workstation is coupled to the digital network communications link 14 through a network controller 28 connected between the network link 14 and the backplane channel 26. The workstation is also coupled to a voice grade telephone line 29 through a modem 31 connected between the backplane channel and the telephone line. Similarly, the workstation can be connected to other digital data conversation services, such as the ISDN digital telephone network.

Multimedia workstation 12 includes a color video frame grabber 34 for capturing and digitizing frames of video from one or more analog video inputs 36. Video inputs 36 are each connected to a video source, such as a video camera 38 providing live analog video signals, or an auxiliary video storage device 40, such as a VCR or video laser disk player providing stored analog video signals. The analog video signals may be of any standard types such as NTSC, SECAM, or PAL.

The multimedia workstation 12 also includes a video buffer 35 which stores a frame of full color video graphics and characters generated by the workstation for display on a 1280×1024 pixel color monitor 30. The video buffer 35 (and associated buffer controller) is connected to the backplane channel 26 for receiving video data from the processor 20. The video buffer is also connected to a video display subsystem 36 which converts the stored video frame data into analog signals for driving the color monitor 30.

The video frame grabber 34 stores its digitized video data directly into a predetermined area of the video buffer 35. Thus, the digitized video input to the workstation by the frame grabber appears directly in a predetermined area on the monitor 30, without having to pass through processor 20 or main memory 22. Further, processor 20 can read back the captured video frame data from the video buffer, store the data in main memory 22, and further process the video data according to the video teleconferencing protocol described herein.

Frame grabber 34 digitizes and stores each frame of video from an analog video source and can deliver up to 30 frames per second of digitized 640×480 true color (24 bits) of NTSC/SECAM/PAL video into video frame buffer 35. A dedicated hardware video compression subsystem 37 can also be connected to the backplane channel 26 to provide high performance video compression of the digitized video data.

The audio features of the multimedia workstation 12 are implemented using an audio controller 42 connected to the backplane channel 26 for interfacing audio signals into the workstation and reproducing audio signals out of the workstation. An audio distribution box 44 is connected to the audio controller for directing audio to and from audio devices such as a microphone 46, a headphone 48, and/or a telephone receiver 50. Auxiliary audio devices such as a recording device, a CD player, or amplified speakers may also be connected to the distribution box 44. Audio controller 42 receives audio input from the distribution box and digitizes the audio using an 8 bit mu-law encoder at 64 kbits per second or less to match typical telephone voice grade audio standards (8 kHz bandwidth). For convenience, the headphones 48 and microphone 46 may be combined into a single headset.

In one commercial embodiment available from Digital Equipment Corporation, multimedia workstation 12 is built around a DECstation™ 5000/200 workstation in which processor 20 is an R3000™ RISC processor and backplane channel 26 is a TurboChannel™ (TC) bus. Network controller 28 is a DEC FDDIcontroller 700™. Frame grabber 34/video buffer 35/video display subsystem 36 is a DECvideo/in™ TurboChannel compatible video system, and audio controller 42 is a DECaudio™ TurboChannel compatible audio controller.

Alternatively, multimedia workstation 12 can be built around a person computer platform, such as an IBM™ compatible PC. Preferably, the PC should have a high speed Intel 80386™, 80486™, or successor processor. The PC should be compatible of running in the Microsoft Windows™ or Windows NT™ graphical operating system environment.

Workstations and PCs of different performance levels can all participate in the same video teleconference using the video teleconferencing protocol of this invention. For instance, less powerful or slower PC's and workstations can simply communicate at a slower video rate with the more powerful workstations, without affecting the overall video rate between other workstations.

The effective video frame rate of a video teleconference depends to a large extent on the quantity of video data handled by a workstation during each video frame. Video compression techniques can greatly enhance the effective frame rate of the video teleconference especially over lower data transfer rate services such as ISDN. Standard compression methods such as JPEG (Joint Photographic Experts Group), MPEG (Motion Picture Experts Group) and Px64 can be implemented using a dedicated hardware subsystem 37 which have recently become available.

A video compression technique which has been found useful for use with the video teleconferencing protocol of this invention features pixel decimation and replication (PDR). This PDR technique effectively subsamples by ½ a full frame of video pixels in the vertical (Y) and horizontal (X) directions. Thus, a frame of video captured by the frame grabber is reduced to one quarter of its original size. The subsampling is accomplished by a scaling function featured on the frame grabber 34 of FIG. 2.

Reconstruction of the image is implemented in software by replicating every pixel received twice along a line, and then replicating the reconstructed line as the next line of the restored image. The replicated line is shifted by a single pixel to prevent any pixel block patterns from forming. Results have shown acceptable quality of the received image, while offering significantly increased system throughput and performance.

Figure 3:
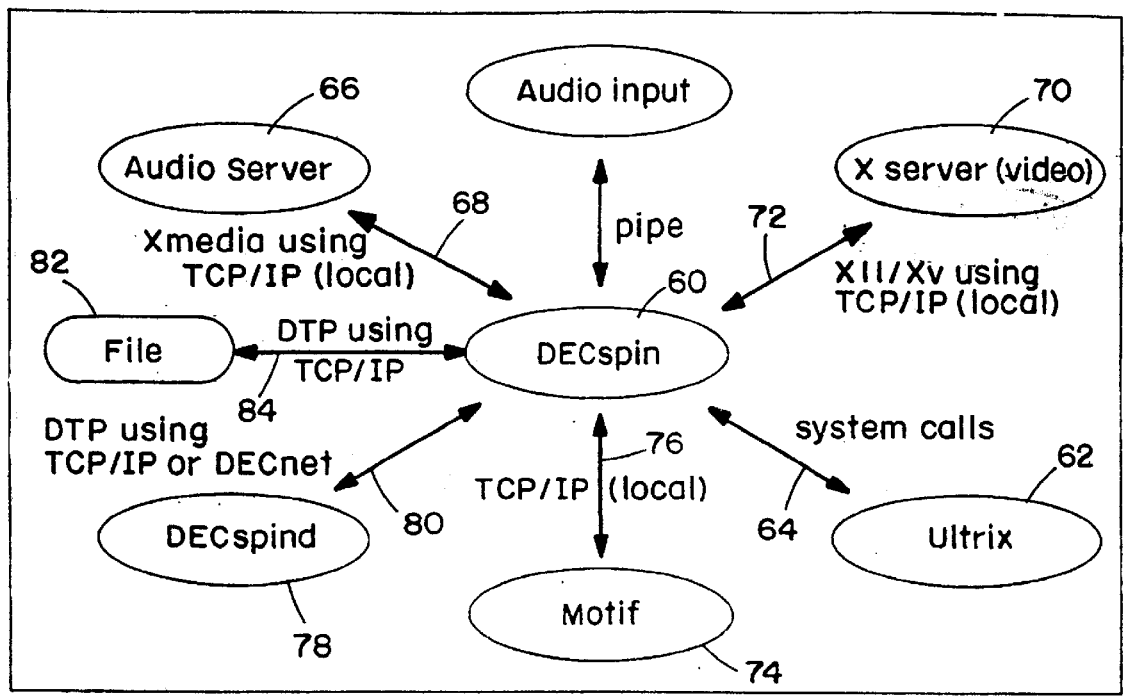
FIG. 3 is a block diagram showing the software environment for implementing a preferred embodiment of a DEC-spin video teleconferencing application for implementing the video teleconferencing features of the system of FIG. 1.

FIG. 3 shows a diagram of the DECspin™ product software system environment for a preferred embodiment of this invention. Generally, the Digital Teleconferencing Protocol (DTP) is implemented by a DECspin™ application program 60 which resides at the application layer of the standard ISO 7-layer network model. The DTP video teleconferencing protocol of this invention is used to transfer audio and video data between workstations, as well as between local applications (loopback), and for storing and retrieving audio and video data to and from a disk file.

The DECspin application program 60 runs on top of an Ultrix™ (V4.2a or its successors) (UNIX™) 62 operating system. All communications between the DECspin application 60 and the UNIX operating system 62 are handled via UNIX system calls 64. The DECspin application program 60 is written as an X Windows™ application running under a Motif™ X Windows manager. A description of the Ultrix, X Windows, and X11 programming environments can be found in "ULTRIX Worksystem Software, X Window System Protocol: X Version 11," Digital Equipment Corporation, order number AA-MA98A-TE, Maynard, Mass. (1988, Version 2.0), the contents of which are incorporated herein by reference. A description of the Motif programming environment can be found in Open Software Foundation, "OSF/Motif Programmer's Guide," Prentice Hall, Englewood Cliffs, N.J. 07632 (1991, Revision 1.1), the contents of which are incorporated herein by reference.

Through UNIX system calls the DECspin application establishes local TCP/IP "sockets" for communication with various software servers providing multimedia services for the DECspin application. The creation and use of UNIX "socket" system calls for creating TCP/IP application connections is discussed in detail by Comer, D. E., "Internetworking With TCP/IP, Vol. 1: Principles, Protocols, and Architecture, Second Edition" Prentice Hall, Englewood Cliffs, N.J. (1991) (pp 337–346), the contents of which is incorporated herein by reference. The DECspin application communicates with an audio server application 66 which provides audio services using X Windows Xmedia commands 68 through a local TCP/IP "socket". The DECspin application communicates with a video X Windows Xserver application 70 which provides video services using X11 and XV extension commands 72 through another local TCP/IP "socket". DECspin communicates with a Motif based graphical user interface (GUI) 74 through yet another local TCP/IP "socket".

The DECspin application communicates with a DECspind "slave" application 78, running on either the local or a remote workstation using the DTP video teleconferencing protocol 80 via another "socket". The DECspind application is a UNIX "deamon" version of the DECspin application which is "slaved" to a DECspin "master" application running on either the local or a remote workstation. The DECspind application is used to receive, reconstruct, synchronize, and display audio and video data sent to it from either a local or remote DECspin application using the DTP protocol. Where the DECspind application is operating on the local workstation, the "socket" is a local TCP/IP "socket". Where the DECspind application is operating on a remote workstation, the "socket" can be either a remote TCP/IP or DECnet "socket".

Figure 3A:
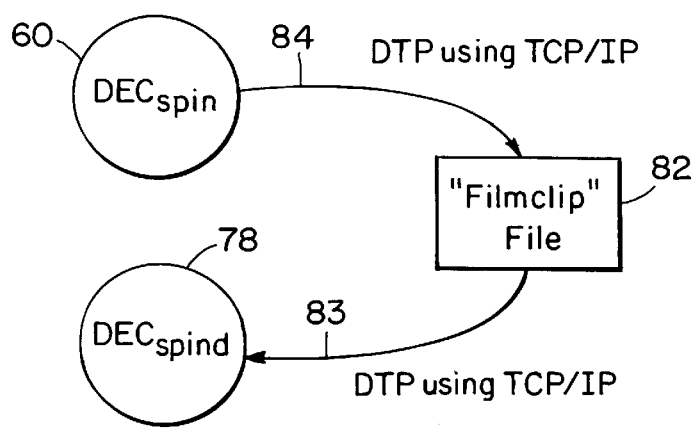
FIG. 3(a) is a block diagram showing the implementation of a "filmclip" file for storage and playback of audio and video using the protocol of this invention.

Furthermore, as also shown in FIG. 3(a), the DECspin application 60 can store audio and video data to a system "filmclip" file 82 using the DTP video teleconferencing protocol via another local TCP/IP "socket" 84. This creates a stored "filmclip" audio and video data stream which can be played back from the "filmclip" file 82 using a DECspind application 78. That is, a DECspind application 78 creates a local TCP/IP "socket" 83 to the stored file, receives data through the socket via the same DTP protocol and plays back the stored audio and video to the user. This is the equivalent of the DECspind application receiving the audio and video data directly from a DECspin application via the DTP video teleconferencing protocol, but without the acknowledgement protocol discussed below.

Figure 4:
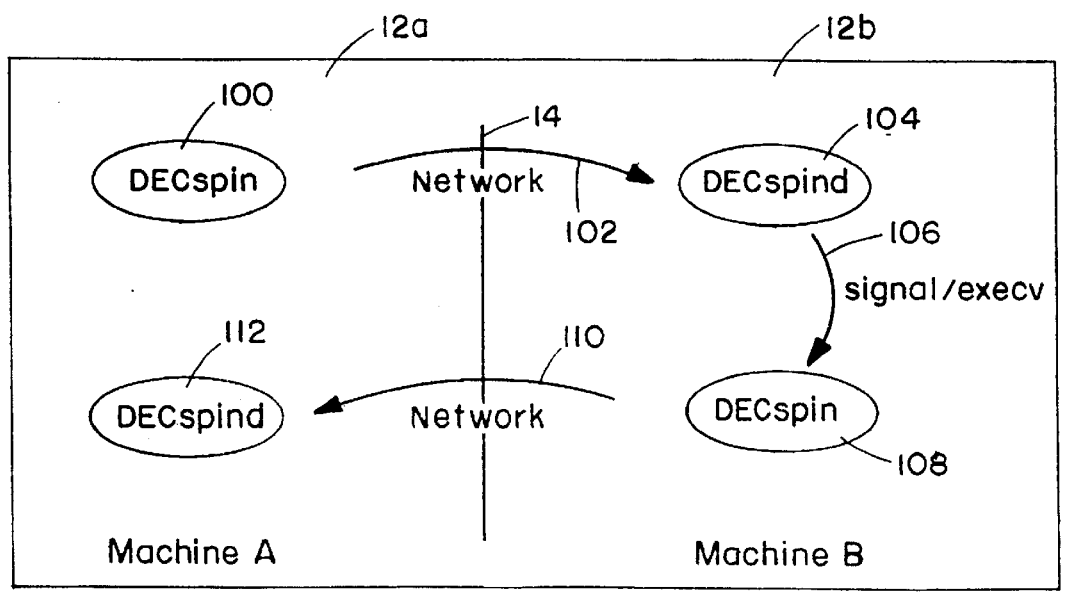
FIG. 4 is a block diagram showing the one-way connections established between two workstations to implement a two-way video teleconference.

FIG. 4 shows a schematic model of two workstations 12a and 12b connected across network 14 during a two-way video teleconference run under the DECspin application. Each "two-way" video teleconferencing connection established between two workstations is composed of separate "one-way" connections. Each one-way connection operates in a "data pushing" mode. That is, audio and video data are "pushed" from the originating workstation to the receiving workstation. This "push" model provides a high degree of security since it prevents another network user from remotely activating workstation's audio and video from across the network.

To originate a video teleconference call to another workstation, a first workstation 12a (Workstation A) executes a local DECspin application program 100 which acts as a "master". DECspin "master" 100 first establishes a one-way network connection 102 with a second workstation 12b (Workstation B) by invoking execution of a DECspind "slave" application program 104 on Workstation B. Digitized audio and video data are sent from Workstation A by DECspin application 100 to Workstation B where they are received by the DECspind application 104. Furthermore, DECspind application 104 signals 106 the user of Workstation B to indicate that a video teleconference call has been received from Workstation A. In response to the signal, a local DECspin "master" application program 108 on Workstation B establishes a separate one-way network connection 110 with Workstation A by invoking execution of a DECspind "slave" application program 112 on Workstation A. If the DECspin application 108 on Workstation B is not currently executing when the signals 106 occur, the DECspin application 108 is executed and places a return call to Workstation A. The return call to Workstation A causes the execution of DECspind application program 112. Audio and video signals from Workstation B are sent by DECspin application 108 to Workstation A where they are received by DECspind application 112 to complete the two-way video teleconferencing connection between the workstations.

Figure 5A:
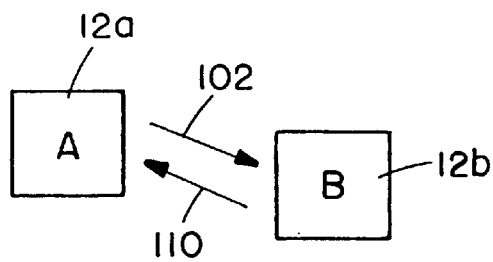
FIGS. 5a–5c are block diagrams illustrating the multiple one-way video teleconferencing connections established between three workstations joined in the same teleconference.
Figure 5B:
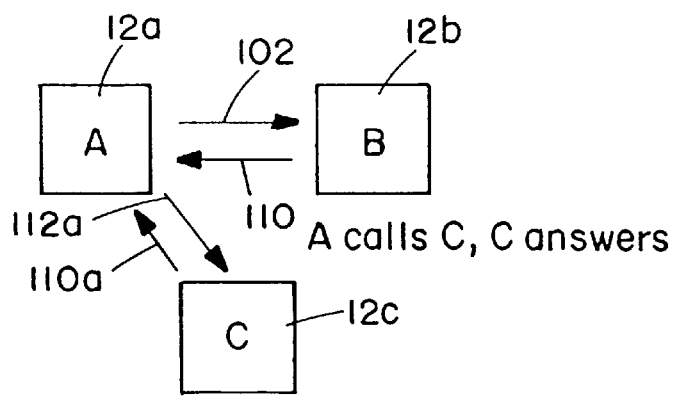
Figure 5C:
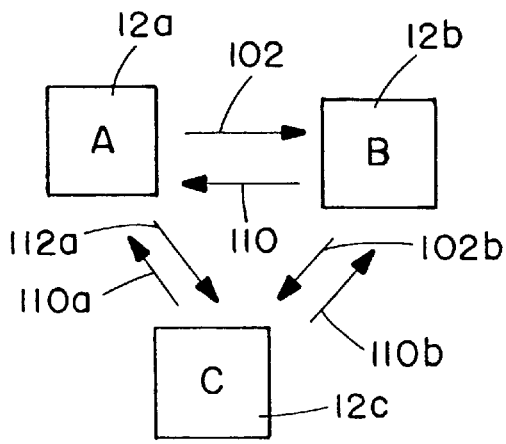

FIG. 5a symbolically shows the two one-way video teleconferencing connections of FIG. 4 between Workstation A and Workstation B. FIGS. 5b and 5c symbolically show the addition of a third workstation 12c (Workstation C) to the video teleconference. As shown in FIG. 5b, Workstation A first establishes a video teleconference with Workstation C independent of Workstation A's video teleconference with Workstation B. This new video teleconference is invoked by Workstation A in a manner identical to the invocation of the conference between Workstation A and Workstation B as shown in FIG. 4, i.e., by creating two one-way connections 102a and 110a between the workstations using DECspin and DECspind application programs running on the two workstations.

Once a video teleconference between Workstation A and Workstation C is established, Workstation C and Workstation B likewise establish two one-way connections 102b and 110b as shown in FIG. 5c to complete the video teleconferencing connections. This can occur by either Workstation B calling Workstation C, or by Workstation A "joining" all the workstations into the same conference by sending a "join" control message to each of the other workstations. Upon receipt of the "join" message, each workstation places a call to each other, unconnected workstations. Thus, each workstation participating in a particular video teleconference establishes and maintains a two-way video teleconference connection with each other workstation in the teleconference. In this manner, a teleconference participant can control what each other participant receives from that workstation, e.g., muting audio or pausing video to certain participants while remaining active to other participants. Furthermore, if a participant has a workstation which can only operate at a limited capacity, each participant can treat that workstation differently from the other workstations, without affecting the overall performance of the video teleconference for the other participants. For example, an audio only workstation can still participate in a teleconference without affecting the video distribution among the other workstations.

It should be noted that each workstation will run only a single DECspin application, which may establish a connection with one or more remote workstations. However, each workstation will execute one DECspind "slave" application session for each workstation to which a video teleconference connection is established. That is, each workstation runs a single DECspin "Master" application, but may run multiple DECspind "Slave" applications simultaneously.

In one preferred embodiment, a single "master" DECspin application can be connected to up to seven DECspind "slave" applications simultaneously. Further, all the DECspind applications need not be members of the same video teleconference. For instance, one workstation may simultaneously be connected to two separate video teleconferences, one with three members and one with four members, for a total of seven DECspind applications driven from a single DECspin application. The members of each conference can only see and hear the members of the same conference. Any workstation common to both conferences can "join" the conferences, in which case all seven members will be joined into a single conference where all can see and hear each other.

Figure 6:
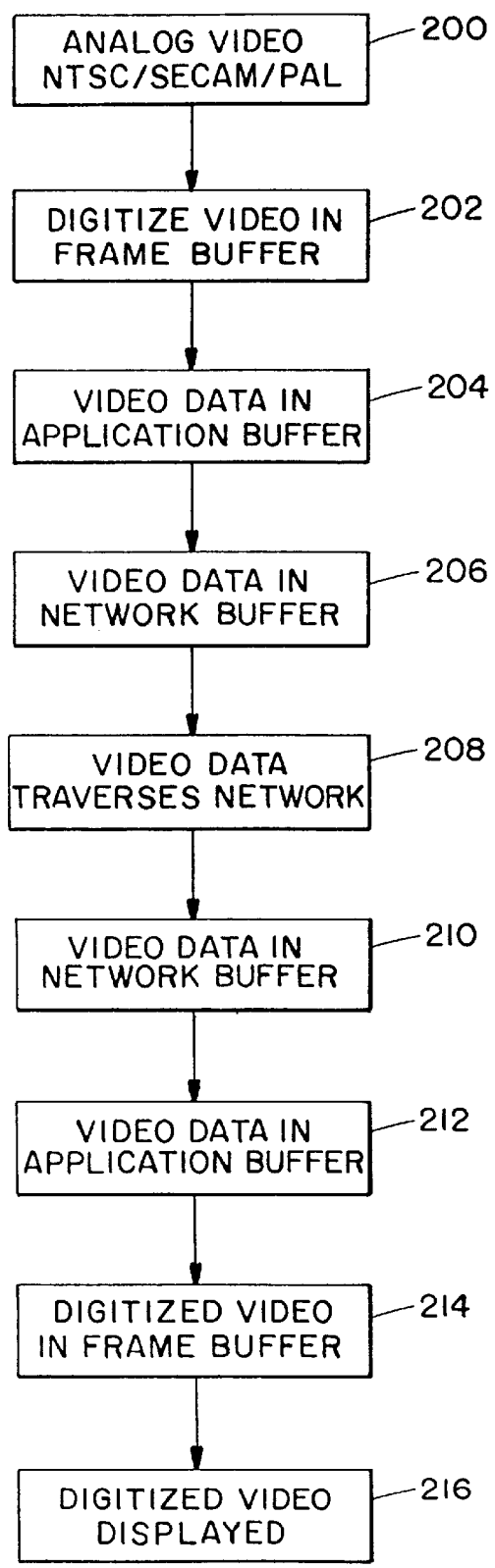
FIG. 6 is a flowchart illustrating the flow of video during a video teleconference.

FIG. 6 is a block diagram showing the flow of video from one workstation to another. The video data source (38 or 40 of FIG. 2) provides standard NTSC, SECAM, or PAL analog video signals 200 which are digitized and stored 202 in a video frame buffer 35 by the frame grabber 34 (FIG. 2). Once an entire video frame has been digitized and stored in the frame buffer, the entire frame of video data is transferred 204 to an application buffer in main memory 22 (FIG. 2) which is assigned to the DECspin application. Once the video data has been transferred to the application buffer, the video frame grabber can begin to digitize and store the next video frame in the frame buffer.

The digitized video data in the DECspin application buffer is next packaged for decoding and reconstruction by the receiving DECspind application, and is sent to the network transport buffer 206. The video data in the network buffer are packetized according to the network protocol in use, e.g., TCP/IP or DECnet, sent 208 across the network, and received 210 into a receiving network buffer. The video data is reconstructed from the network protocol packets and sent 212 to a DECspind application buffer in main memory 22 (FIG. 2) of the receiving workstation. The video data are accumulated into the DECspind application buffer until a full frame of video has been received. Graphics are added to the video to form a composite video image for display. The composite video image is then sent 214 to the frame buffer from which the digitized composite video image is converted for display 216 on the workstation monitor.

Figure 7:
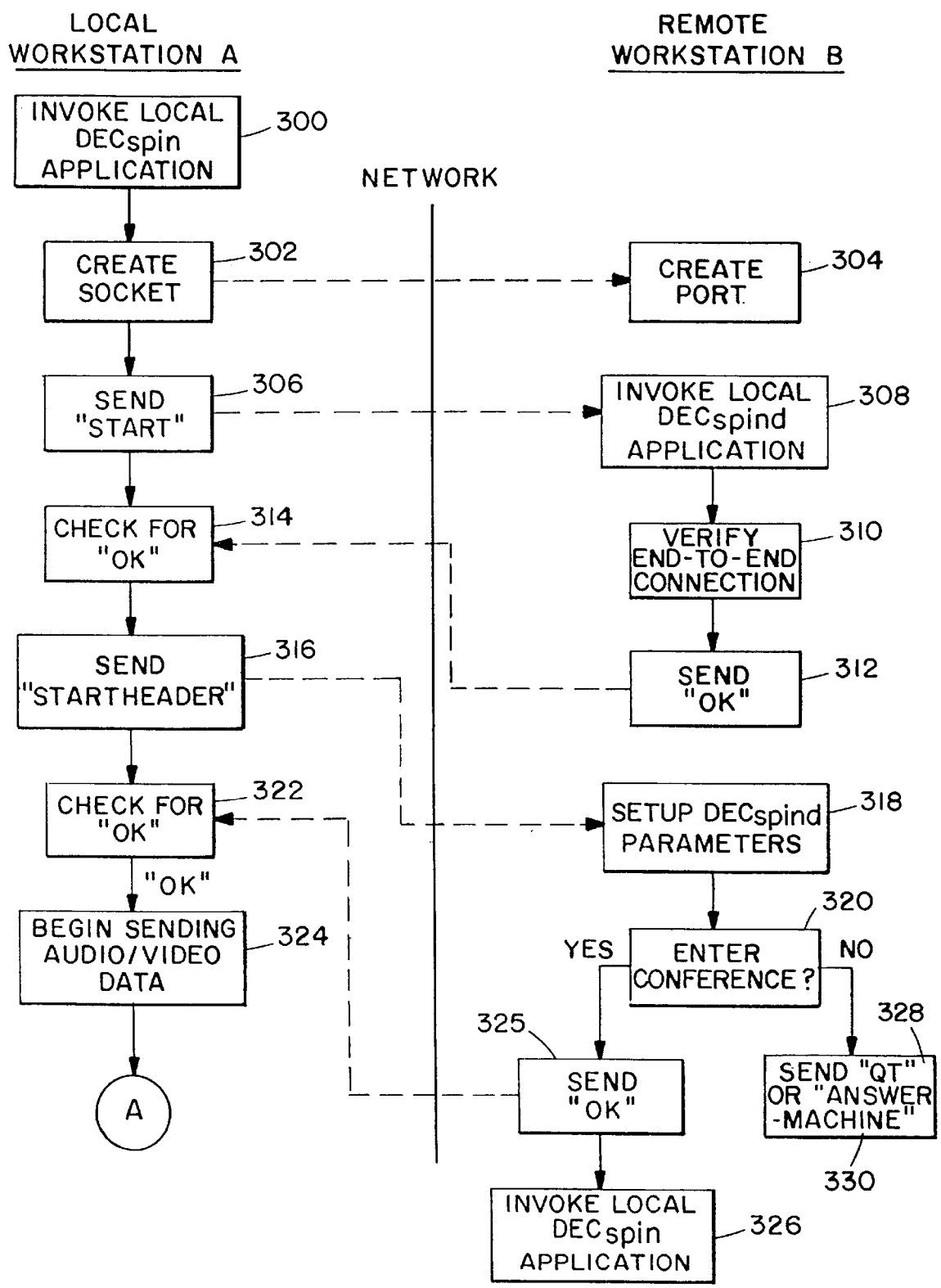
FIG. 7 is a flowchart illustrating the teleconferencing protocol of this invention for establishing a video teleconference connection between two workstations.

FIG. 7 is a flowchart showing the commencement of a video teleconference between a local workstation, Workstation A, and remote workstation, Workstation B. To begin a teleconference, the user of Workstation A invokes 300 the execution of the local DECspin application. The executing DECspin application causes the creation of a network "socket" 302 through a standard UNIX system call. Creation of the socket on Workstation A causes the creation of a corresponding "port" 304 on the remote Workstation B. This "socket-to-port" connection establishes a peer-to-peer connection for the DECspin and DECspind applications running on the two-connected workstations. That is, data put into the "socket" on Workstation A are transferred to the port on Workstation B via a standard network protocol such as TCP/IP or DECnet. UNIX treats the established socket as a standard file descriptor to which the DECspin application simply sends the data stream to be transferred to Workstation B. Thus, this data transfer operation is transparent to the DECspin application which simply accesses the "socket" through standard UNIX calls.

Once the "socket" to Workstation B is established, DECspin sends a START message 306 through the "socket" to Workstation B. FIG. 8 shows the format of the START message, which is simply a two byte long data string.

Upon receipt of the START message, Workstation B invokes execution 308 of a DECspind "slave" application which connects to the previously created port 304 to receive data from the "socket" on Workstation A. Once the DECspind application verifies 310 this end-to-end connection between the two workstations, DECspind sends 312 an OK acknowledgement message through the "port" back to the DECspin application. FIG. 9 shows the format of the OK message, which is simply a two byte data stream.

Upon receipt of the OK message from the "socket," the DECspin application sends 316 a STARTHEADER message through the "socket" to the DECspind application which is used to set up 318 the parameters for the current video teleconferencing session. FIG. 10 shows the format of the STARTHEADER message, the fields of which convey the parameter information required by the DECspind application. These parameter fields include a video width field 400 and a video height field 402 for setting the initial DECspind picture size. A bits per pixel field 404 sets DECspind to display either a black and white image (8 bits) or a true color image (24 bits). A frame rate field 406 sets the desired initial frame rate. A frame count field 408 sets the number of frames expected to be sent during the video teleconference. The value of this field is set to −1 for a live video teleconference (to indicate infinity) where the total number of frames to be sent is indefinite. Otherwise, the actual number of frames to be transferred during the session is entered into the field, e.g., for a video message of predetermined duration. A login/user handle field 410 identifies the calling party and is used by DECspind to set up the return audio and video connections from Workstation B to Workstation A. Finally, a DTP (DECspin teleconference protocol) flag field 412 conveys multiple single bit flags which indicate particular operational modes such as video compression type used (if any) audio encoding type used, whether to expect audio, video, or both, or how DECspind should respond to certain commands.

Once DECspind receives the STARTHEADER and determines 320 that it will participate in the video teleconference with Workstation A, it issues another OK message to the DECspin application on Workstation A. The receipt 322 of this OK message causes the DECspin application to begin transmission 324 of audio and video data to the DECspind application on Workstation B.

Furthermore, when the user answers the call the DECspind application invokes execution of its own local DECspin application, which establishes a return connection for sending return audio and video data from Workstation B to Workstation A, to complete the two-way video teleconference. The DECspin "master" application now running on Workstation B establishes communications with a DECspind "slave" application on Workstation A in a process equivalent to that just described with respect to establishing communications between workstation A and workstation B. In this case, however, Workstation B is viewed as the local workstation, and Workstation A is viewed as the remote workstation.

With respect to the invocation 326 of the DECspin application on Workstation B, this may occur in one of two ways. If there is no DECspin application currently running on Workstation B, then DECspind initiates execution of the DECspin application, and passes the required parameters to the DECspin application through the application invocation command line. If the DECspin application is already running on Workstation B (e.g., supporting another video teleconference in progress), the DECspind application will append the parameters received via the STARTHEADER message into an information file used by the executing DECspin application. This information file is in turn used to control execution of the DECspin application. Only one DECspin application may be executing on a workstation at one time. However, multiple DECspind applications may be running on the same workstation.

Figures 11, 12, 13:
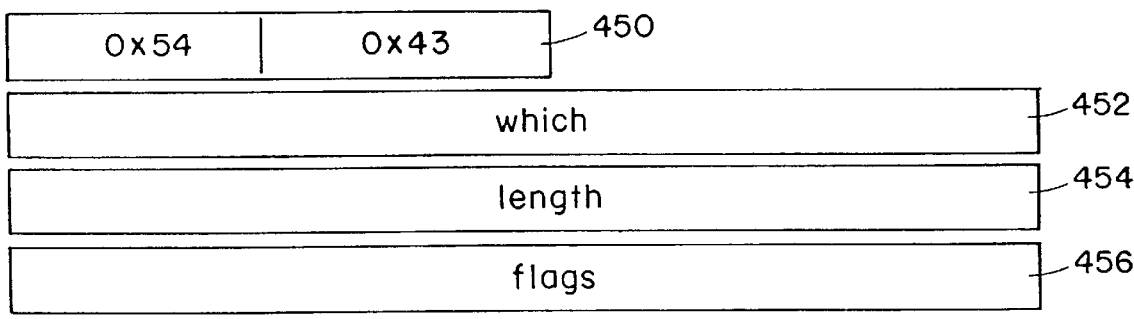
FIG. 11 illustrates the format of the QUIT message of the teleconferencing protocol of this invention.
FIG. 12 illustrates the format of the ANSWERMACHINE message of the teleconferencing protocol of this invention.
FIG. 13 illustrates the format of the CONTROL message of the video teleconferencing protocol of this invention.

Alternatively, if the DECspind application running on Workstation B receives the STARTHEADER message and the user does not want to, or cannot participate in the video teleconference, the workstation returns 228 a QUIT message to the DECspin application on Workstation A. FIG. 11 shows the format of the QUIT message, which is a two byte data string. Upon receipt of the QUIT message, the DECspin application on Workstation A terminates the connection with the DECspind application on Workstation B.

As another alternative, the DECspind application running on Workstation B can respond to the STARTHEADER like a telephone answering workstation by returning an ANSWERMACHINE message back to the DECspin application. FIG. 12 shows the format of the ANSWERMACHINE message which is also a two byte data string. The DECspin application running on Workstation A allows the user to respond to the ANSWERMACHINE message by sending a fixed length (typically 20 seconds) audio and video message to the DECspind application on Workstation B where it is stored in a "filmclip" file for deferred playback by the user. The audio and video message may also be viewed by the user of workstation B as it is arriving for storage, similar to "screening" an incoming telephone call.

FIG. 13 shows the format of a CONTROL message, the fields of which convey control information and commands between workstations participating in a video teleconference. Specifically, a two byte identifier field 450 identifies the CONTROL message. At which field 452 identifies the type of control message to follow, and a length field 454 indicates the length of the control message. A flag field 456 conveys other information about the CONTROL message to the receiving workstation, for instance whether or not an acknowledgement message should be sent to the originator of the CONTROL message upon its receipt.

One type of CONTROL message is a "JOIN" message. This message is sent by a local workstation to all remote workstations currently participating in a video teleconference with the local workstation to join all the workstations into the same video teleconference. As discussed above, a workstation may carry on more than one video teleconference simultaneously without the other participants being connected to each other. Upon receipt of a "JOIN" CONTROL message, each of the remote workstations places a video teleconference call to each of the other remote workstations which are currently connected to the local workstation but not to that remote workstation. In this manner, individual dual one-way video teleconferencing connections are established between each of the workstations that has been "joined" into the teleconference. It should also be noted that any workstation can leave the teleconference without affecting the teleconference among the removing workstations by simply terminating its video teleconference connection to each of the workstations.

Figure 14A:
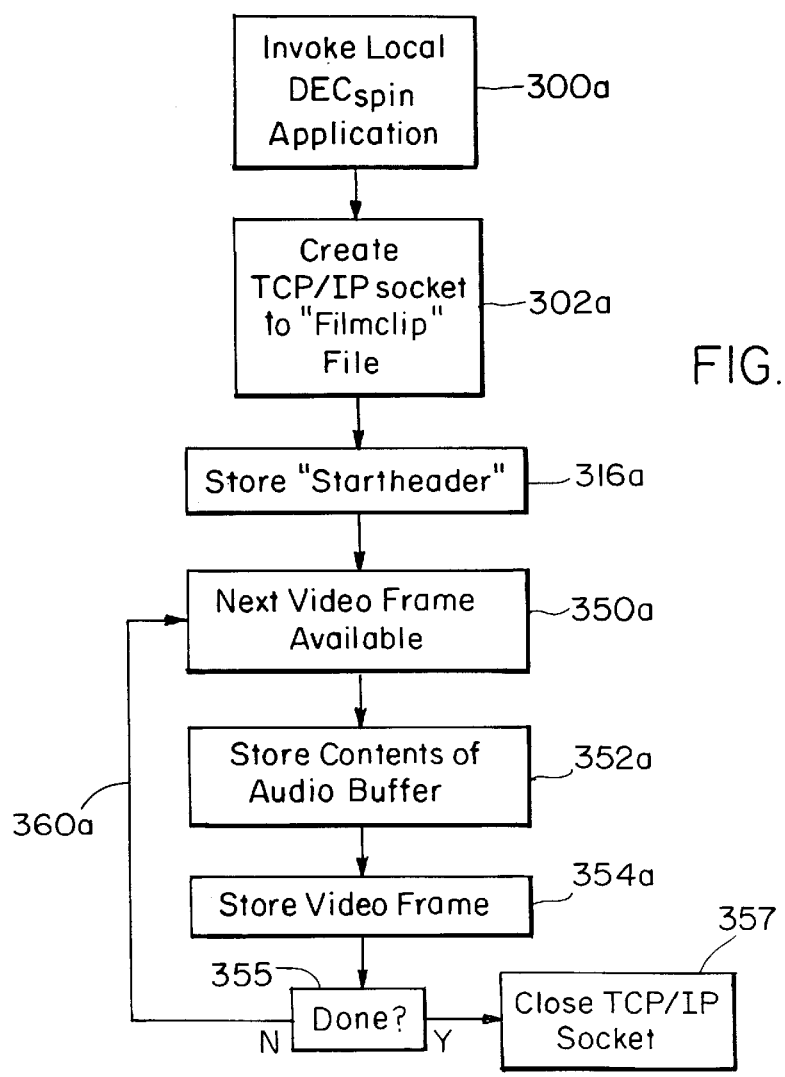
FIG. 14(a) is a flowchart showing the storage of audio and video data to a "filmclip" file using the video teleconferencing protocol of this invention.
Figure 14:
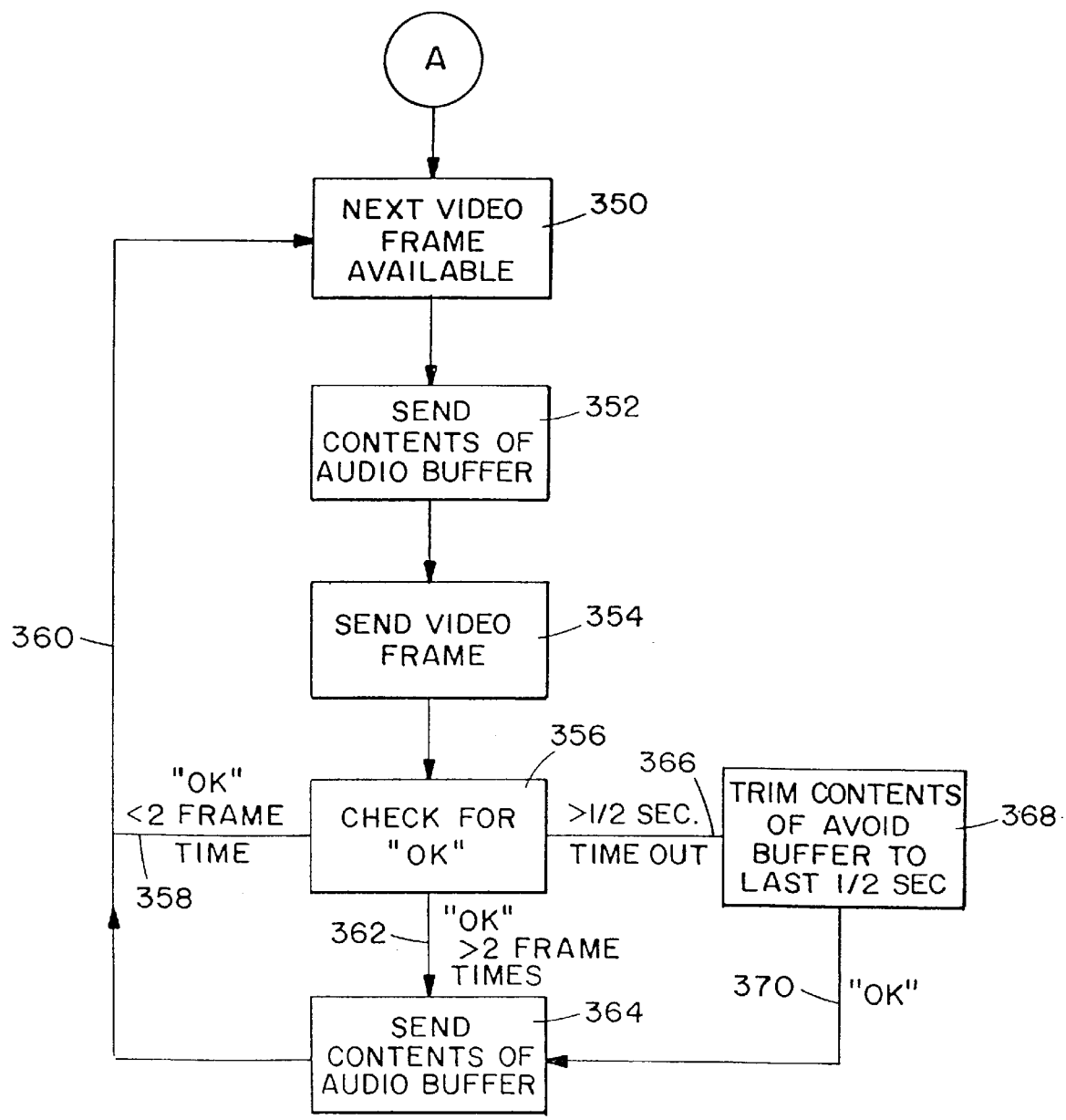
FIG. 14 is a flowchart showing the audio and video data transfer sequence of the video teleconferencing protocol of this invention.

FIG. 14 is a flowchart showing the synchronized transmission of digitized audio and video data from a DECspin application running on a local workstation, Workstation A, to a DECspind application running on a remote workstation, Workstation B. Video data are collected on a continuing frame by frame basis. One frame is collected and stored in the frame buffer of the frame grabber 34 (FIG. 2) until the frame is transferred to the DECspin application buffer in main memory 22 (FIG. 2) for transmission across the network to a DECspind application, or until the frame is discarded to make room for collection of a new video frame. Digitized audio data are collected into an audio data buffer. The audio data is drawn out of the audio buffer by the DECspin application which sends the audio data as a continuous stream to the DECspind application.

The audio and video data sent across the network can be modeled as frames of video data inserted into a continuous stream of audio data. In general, the DECspin application will not discard audio data, but will discard video frames as necessary. Since the ear differentiates sound and the eye integrates images, breaks in the audio are more objectionable to a listener than breaks in the video are to a viewer. As a result, the highest priority of the DECspin application is to deliver a continuous, unbroken digitized audio stream to the DECspind application. On the other hand, video frames are routinely discarded dependent on network throughput, and other workload factors.

Figure 15:
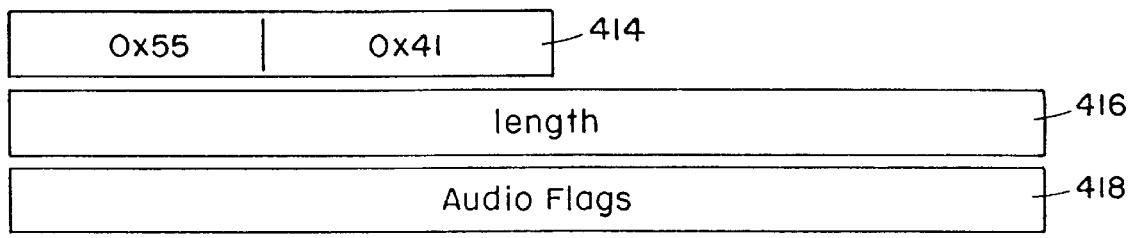
FIG. 15 shows the format of the AUDIOHEADER message of the video teleconferencing protocol of this invention.

After a video frame has been digitized and stored in the frame grabber buffer, the frame is made available 350 to the DECspin application for transfer to the DECspind application running on Workstation B. Digitized audio stored in the audio buffer, up to the time when the frame becomes available, is sent 352 first to the DECspind application. The DECspin application begins the audio data transmission by sending an AUDIOHEADER message through the "socket" to the DECspind application. FIG. 15 shows the format of the AUDIOHEADER message, the fields of which convey information about the audio data to follow. Specifically, a two byte identifier field 414 identifies the AUDIOHEADER message, a length field 416 indicates the amount of digitized audio data to follow the AUDIOHEADER message, and an audio flag field 418 indicates parametric information about the audio data. One such audio flag, for instance, indicates the type of audio encoding used to digitize the audio signal, e.g., mu-law encoding. Packets of up to 16 kB each of audio data are then sent to the DECspin "socket" immediately following the AUDIOHEADER message. The audio data packets are reassembled into a continuous audio data stream by the receiving DECspind application, and the audio is sonically reproduced.

Figure 16:
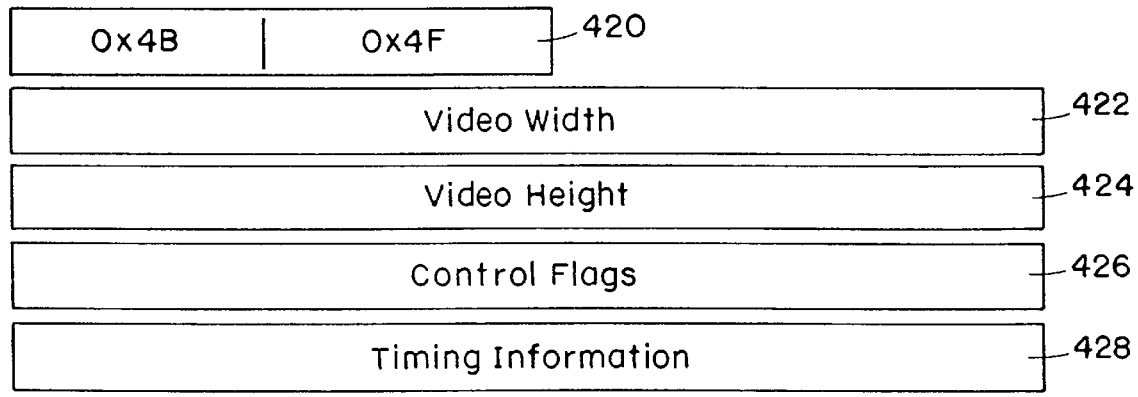
FIG. 16 shows the format of the VIDEOHEADER message of the video teleconferencing protocol of this invention.

Next, the frame of available video data 350 is sent 354 from the DECspin application to the DECspind application immediately following the audio data. The DECspin application begins the video frame transmission by sending a VIDEOHEADER message through the socket to the DECspind application. FIG. 16 shows the format of the VIDEOHEADER message, the fields of which convey information about the frame of video data to follow. Specifically, a two byte identifier field 420 identifies the VIDEOHEADER message. A video width field 422 and video height field 424 indicate the size of the video frame to follow the VIDEOHEADER message. A control flag field 426 conveys parametric information about the video data frame. Finally, a timing information field 428 carries a time stamp which helps the DECspind application to realign the audio and video data for synchronized reconstruction at workstation B. The time stamp is a numerical value corresponding to the byte count of the continuous audio stream taken at the end of the current video frame.

A full frame of digitized video data is sent from the DECspin application to the DECspind application immediately following the VIDEOHEADER message. The DECspin application then stops sending data through the "socket" 356 until it receives an OK message (FIG. 9) from the DECspind application which acknowledges receipt and successful reconstruction of the full video frame.

The video frame data are broken into data packets of 32 kB or less to facilitate efficient transmission through the "socket" and across the network by the TCP/IP protocol. Although the video data could be sent through the "socket" as a single, unbroken stream of approximately 300 kbytes of data (for a black and white image having 640 by 480 pixels, each 8 bits deep), any error occurring at the TCP/IP protocol level would require retransmission of the entire 300 kbyte data stream. Therefore, by breaking the data into smaller 32 kbyte maximum size packets, any error at the TCP/IP protocol level will only require retransmission of at most 32 kbytes of video data. This significantly increases the efficiency of video transmission across the network which results in a higher overall video throughput.

The DECspind application collects the received video data packets into an application buffer until an entire frame of video data has been collected. At that time, the DECspind application proceeds to display the received video frame to the workstation user, and issues an OK message (FIG. 9) to the DECspin application to acknowledge receipt and successful reconstruction of the video frame.

Figure 17:
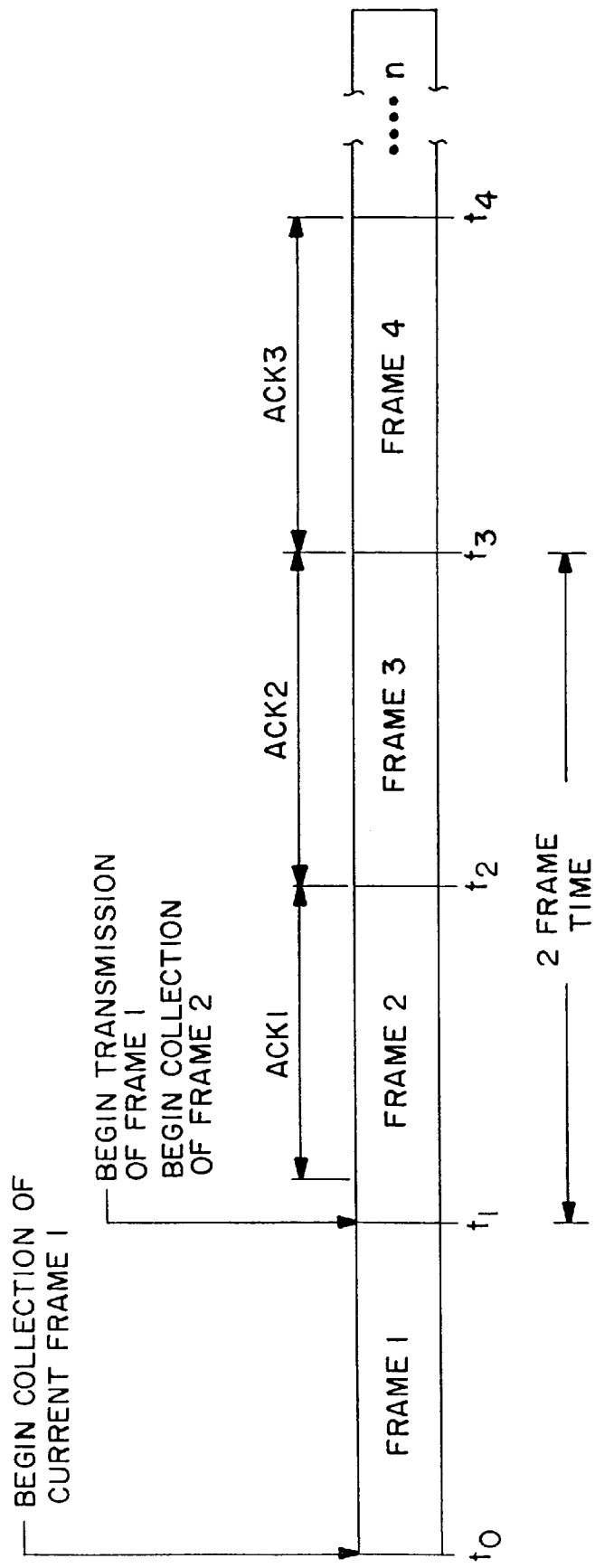
FIG. 17 shows a timing diagram of the audio and video data synchronization of the video teleconferencing protocol of this invention.

The DECspin application responds to the OK message sent by the DECspind application in one of three ways. The response depends on when the OK message is received relative to the time required for the video frame grabber to make the next video frame available, i.e., "the frame time" between available frames. FIG. 17 illustrates the timing and operations associated with the receipt of the OK message by the DECspin application, and is discussed in detail below.

The first situation occurs when DECspin receives the OK message within two frame times 358 (FIG. 14) of sending the last available video frame to the DECspind application. In this case, DECspin returns 360 to determine if 350 a new video frame is available from the frame grabber buffer, and the entire process of sending audio and video data to the DECspind application is repeated.

The second situation occurs when DECspin receives the OK message beyond two frames times 362, but less than a "time out" time period, after sending the last available video frame to the DECspind application. In this case, DECspin first sends 364 the digitized audio accumulated in the audio buffer to the DECspind application to prevent loss of this audio data which would result in a break in the continuity of the reconstructed audio. DECspin then proceeds to return 360 and determine 350 if a new video frame is available from the frame grabber buffer for transmission, and the entire process of sending audio and video to the DECspind application is repeated.

The third situation occurs when the DECspind application has not received an OK message within a specified "timeout" period 366. In a preferred embodiment, the timeout period is set at one half second. A timeout can occur when, for instance, the network is reset, or a processor intensive operation is being performed at the receiving workstation which competes with the DECspind application for workstation resources. In timeout situations, loss of part of the continuous audio signal as well as part of the video signal is unavoidable. In this case, the DECspind application continually trims 368 the audio buffer to only retain audio data corresponding to the last time out interval, which prevents overflow of the audio buffer. For instance, where the timeout interval is one half second, DECspin only retains the last one half second of audio data in the audio buffer. Finally, when DECspin receives the OK message 370 from the DECspind application, DECspin first sends 364 the last half second of digitized audio accumulated in the audio buffer, and then proceeds 360 to determine 350 if a new frame of video data is available from the frame grabber buffer, and the entire process of sending audio and video to the DECspind application is repeated.

FIG. 17 illustrates a more detailed timing analysis of these three video frame acknowledgement situations. At time $t_0$, the frame grabber begins to capture a digitized video frame in its buffer, which becomes available for transmission by the DECspin application at time $t_1$. At time $t_1$, video FRAME1 is transferred from the frame grabber buffer to the DECspin application buffer in main memory, and the frame grabber begins to accumulate the next frame FRAME2, in the frame grabber buffer.

The DECspin application then begins to send the audio and video data to the DECspind application shortly after time $t_1$. If the acknowledgement OK message for FRAME1 is received from DECspind before the next video frame, FRAME2, is available at time $t_2$, i.e., during the ACK1 interval, then DECspin waits until time $t_2$ to begin sending the audio and video FRAME2 data. If the acknowledgement OK message for FRAME1 is received from DECspind after FRAME2 is available at time $t_2$ but before the next video frame, FRAME3, is available from the frame grabber buffer at time $t_3$, i.e., during the ACK2 interval, then DECspin begins immediately sending the audio data accumulated in the audio buffer and video frame FRAME2 to the DECspind application.

In the case where the acknowledgement OK message is received greater than two frame times after video frame FRAME1 became available from the frame grabber buffer at time $t_1$, e.g., after time $t_3$ during the ACK4 time interval, the currently available video frame is FRAME3 which became available at time $t_3$. Since the frame grabber has only a single frame buffer, the FRAME2 data is discarded, and not sent to the DECspind application. In this manner, only the freshest video frame is sent across the network. Regardless of when the OK message is received after the two frame timeout limit, the last available (and freshest) video frame is sent to the DECspind application, and all other intervening video frames are discarded. The last available video frame is sent shortly after the OK message is received.

The DECspind application synchronizes the received audio data stream with the video frame data to be displayed by comparing the audio data stream to the time stamps of the received video frame data. Due to system time delays and the order of audio and video data transmissions, a frame or video will be available for display by the DECspind application prior to reproduction of its corresponding audio. A typical system time delay is about ¼ to ½ second for the audio signal. Audio data received by the DECspind application is accumulated into a DECspind audio buffer, and read out for sonic reproduction on a continuous basis. DECspind keeps track of the number of audio data bytes received from the DECspin application, and thus generates a continuously updated audio time stamp. As discussed above, each video frame is preceded by a VIDEOHEADER (FIG. 16) message which includes a timing information field 428 holding a time stamp value corresponding to the audio byte count at the end of that video frame time. DECspind reads this time stamp information and delays displaying the associated reconstructed video frame until an audio time stamp generated from the received audio data stream matches the video frame time stamp. The video frame is displayed when the match occurs. In this manner, the audio always appears to be synchronized to the displayed video frames, regardless of the video frame rate or the loss of intervening video frames.

FIG. 14(a) is a flowchart showing the procedure for storing synchronized audio and video data to a multimedia "filmclip" file accessible by a local workstation. This procedure is similar to the synchronized transmission of audio and video data between two workstations represented by the flowcharts of FIGS. 7 and 14.

A user of the workstation begins storage of a "filmclip" file by invoking 300a the execution of a local DECspin application. The executing DECspin application causes the creation of a local TCP/IP "socket" 302a to the target "filmclip" file through a standard UNIX system call. The target file can reside on the local workstation hard drive 24 (FIG. 2) or on a networked file server accessible through the workstation network interface. In the case of a "filmclip" file created as an "answering machine" message on another remote workstation, the target file resides in the message area of the remote workstation and is accessed from the local workstation by a remote TCP/IP "socket".

Once the "socket" to the "filmclip" file is established, DECspin sends 316a a STARTHEADER message (FIG. 10) through the "socket" for storage in the file. This stored message serves to store the format of the audio and video data and is used to setup the DECspind application which will playback the audio and video data from the file.

Next, audio and video data are stored to the "filmclip" file in a serial fashion. Video data are collected on a continuing frame by frame basis. After a video frame has been digitized and stored in the video buffer 35 by the frame grabber 34 (FIG. 2), the digitized frame is made available 350a to the DECspin application for storage in the "filmclip" file. Digitized audio stored in the audio buffers up to the time when the video frame becomes available, is stored first 352a to the "filmclip" file. The DECspin application begins the audio data storage by sending an AUDIOHEADER message (FIG. 15) through the "socket" for storage in the "filmclip" file. Packets of up to 16 KB each of audio data are then stored to the "filmclip" file immediately following the AUDIOHEADER message.

Next, the frame of available video data is stored 354a to the "filmclip" file by the DECspin application immediately following the audio data. The DECspin application begins storage of the video frame by first sending a VIDEOHEADER message (FIG. 16) through the "socket" for storage in the "filmclip" file. A full frame of digitized video data is then stored to the "filmclip" file immediately following the VIDEOHEADER message.

Next, the DECspin application determines 355 if it is done storing data to the "filmclip" file. If the DECspin application is done, then it closes 357 the TCP/IP "socket" to the "filmclip" file. If the DECspin application has more data to store to the "filmclip" file, the application returns 360a to determine if a new video frame is available 350a from the frame grabber buffer, and the entire process of storing audio and video data to the "filmclip" file is repeated.

Figure 14B:
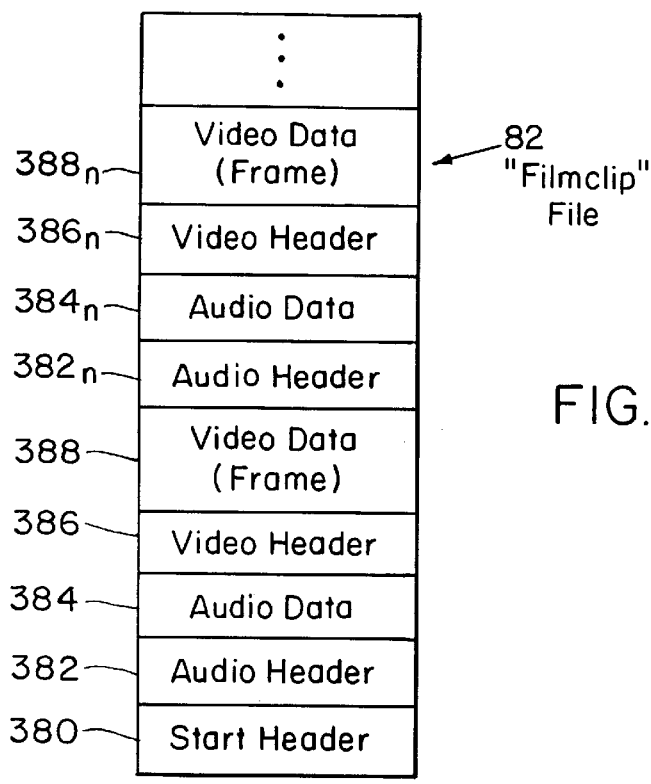
FIG. 14(b) shows the resulting structure of audio and video data stored in a "filmclip" file by the process shown in FIG. 14(a).

FIG. 14(b) shows the resulting structure of the audio and video data stored in a "filmclip" file 82 by the DECspin application process of FIG. 14(b). A STARTHEADER data block 380 stores the STARTHEADER message first stored (316a, FIG. 14(a)) to the "filmclip" file by the DECspin application. Next, an AUDIOHEADER 382 and corresponding audio data 384 data blocks hold audio buffer data stored (352a) by the DECspin application. Next, a VIDEOHEADER 386 and corresponding video data 388 data blocks hold a frame of video data stored (354a) by the DECspin application. The pattern of AUDIOHEADER $382_n$, audio data $384_n$, VIDEOHEADER $386_n$, and video data $388_n$ data blocks repeat in sequence until the end of the file.

To replay the audio and video data from a "filmclip" file, the user of the workstation invokes the execution of a DECspind application. The DECspind application opens a TCP/IP "socket" to the "filmclip" file and reads the data serially from the file as if receiving the data directly from a DECspin application.

Graphical User Interface

Figure 18:
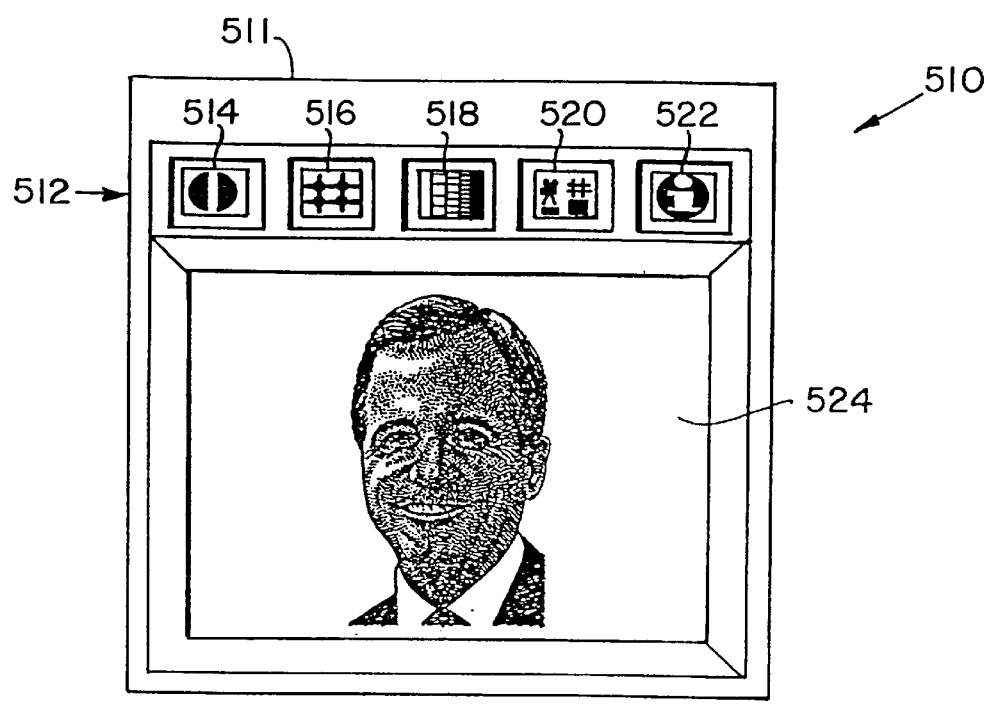
FIG. 18 shows the top level graphical user interface window for controlling a video teleconferencing session of this invention.

FIG. 18 shows a graphical user interface (GUI) window 510 displayed on the monitor of a workstation 12 (FIG. 2) for controlling a DECspin video teleconferencing session. Teleconferencing session window 510 is generated by the DECspin application using X Windows managed by a Motif manager, and is displayed as a graphic window on the color monitor 30 of the multimedia workstation 12 (FIG. 2). DECspin session window 510 provides the user of a networked multimedia workstation with an interface for accessing the top level video teleconferencing functions of the DECspin application.

When a user invokes the DECspin application to begin a video teleconference through, for instance, a UNIX command, the DECspin session window 510 appears on the workstation color monitor. A window title bar 511 identifies the DECspin application and version number to the user. From this point on, all teleconferencing functions are accessed through the graphical interface associated with this and other Motif managed X Windows graphics. Furthermore, through this graphical interface, the user can also store and playback audio/video "filmclip" messages.

DECspin application window 510 includes a Motif menu bar 512 having a plurality of user selectable "pushbuttons" 514, 516, 518, 520, and 522. These "pushbuttons" are presented as a Motif RowColumn widget which controls all the top level DECspin functions available to the user. Each of the "pushbuttons" presented to the user through the Motif windows are activated with a graphical pointing device such as a mouse. A "pushbutton" may for instance be activated by moving the mouse to cause a graphical pointer to enter the area of the pushbutton to select that button, and then activating a mechanical switch on the mouse to activate the corresponding "pushbutton". Furthermore, the "pushbuttons" also lend themselves to use with a touch screen display, where the user simply touches the "pushbutton" on the screen to activate it. An activated "pushbutton is highlighted to indicate activation.

The DECspin graphical user interface has no first or second level language specific functional controls, and thus DECspin appears to the user as an internationalized application. As such, all top level function pushbuttons 514–522 of menu bar 512 are identified by iconic symbols which have been internationalized where possible.

Activation of one of the Motif "pushbuttons" of menu bar 512, in most cases, causes creation of a second level pop-up window. The second level pop-up window in turn, offers the user next level of functional choices associated with the selected top level function.

An audio help, or "talking button", feature is also associated with the Motif "pushbuttons" available for selection by the user. By simultaneously selecting a Motif "pushbutton" while holding down a keyboard "help" key, a stored audio message is audibly reproduced which describes the function of the selected "pushbutton".

A live video image appears in a video window 524 displayed below the menu bar 512. Video window 524 displays the current local image being generated by the frame grabber 34 (FIG. 2) and stored in the video frame buffer 36 (i.e., video window 524 frames that section of the display memory frame buffer in which the video grabber stores each frame of video.) The video window acts as a video "monitor" for viewing local video throughout the video teleconference session. Furthermore, the size of the video window 524 can be changed by using the mouse to move a side or corner of the window. Changing the size of the video window affects the number of pixels encompassed by the window, and thus the number of video pixels to be sent to another workstation during each video frame. Smaller windows achieve a higher frame rate since less data per frame must be sent. Conversely, larger windows achieve a lower frame rate. Thus, the video frame rate for a video conference connection can be adjusted by simply sizing video window 524.

Figure 19:
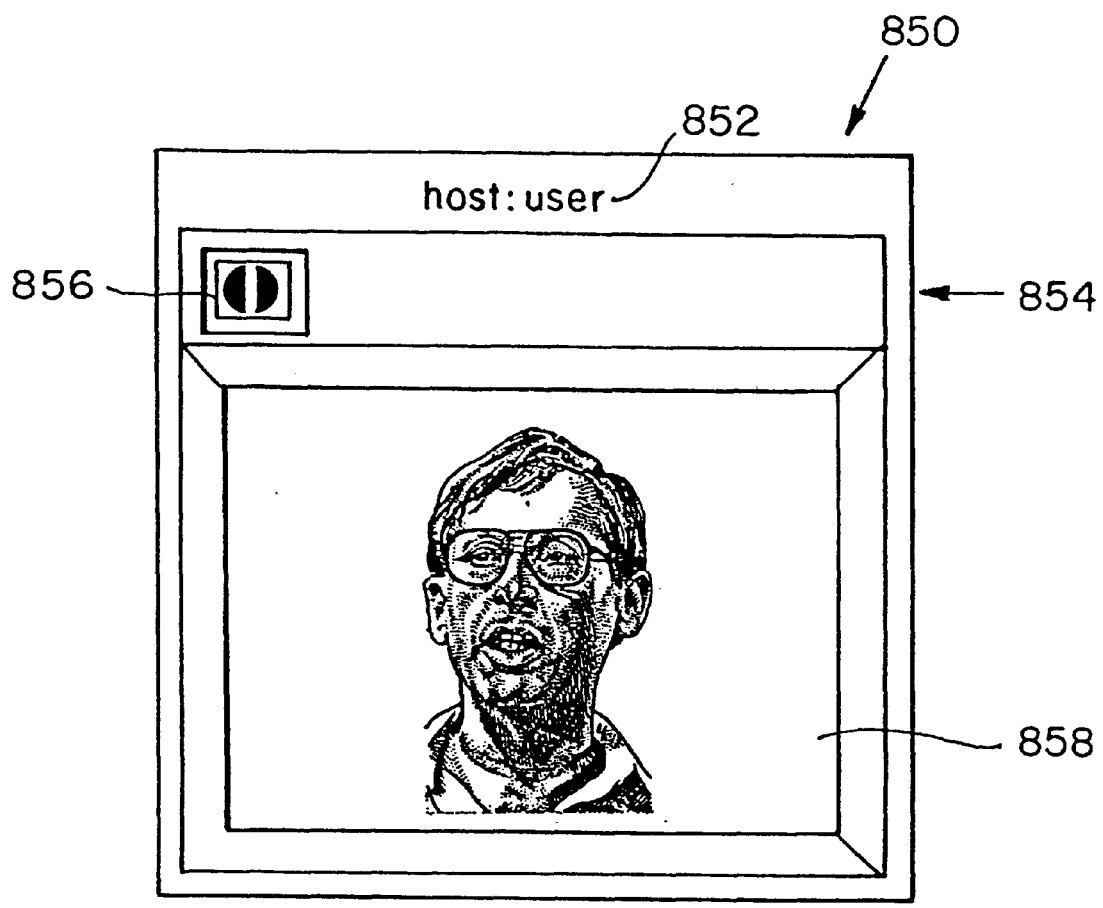
FIG. 19 shows the graphical user interface window for displaying video data received from another workstation during a video teleconferencing session of this invention.

When a called workstation invokes the "slave" DECspind application to receive audio and video from a calling DECspin application, the DECspind application displays a DECspind session window 850 as shown in FIG. 19. The DECspind session window appears similar to the DECspin session window 510 of FIG. 18, except that the title bar 852 displays the identification of the calling party, and the menu bar 854 can contain only an "exit" pushbutton 856. A video window 858 displays the video data received from the DECspin application. Unlike the video window 524 of the DECspin session window 510, video window 858 of the preferred embodiment is not resizable to change the video resolution since its size depends on the resolution of the video data sent by the "Master" DECspin application. Furthermore, since the video teleconferencing parameters are set by the "Master" DECspin application, no functional controls are provided other than an "exit" control which when activated will terminate the video teleconferencing connection. As an alternative preferred embodiment, a "control" pushbutton can be added to the DECspind session window, which when activated offers the user a limited control set for adjusting the received video image or audible levels. Furthermore, a "monitor" pushbutton can also be added to allow the user to monitor, for instance, the data rate of the incoming video teleconference associated with the DECspind session window.

Referring again to the DECspin application session window 510 of FIG. 18, a functional description of the menu bar 512 "pushbuttons" is as follows. The "exit" pushbutton 514 when activated forces all video teleconferencing connections to the workstation to cease, and for the DECspin application to terminate. Any necessary cleanup of network connections is also done. If any changes to the DECspin configuration occurred during the video teleconference session, a pop-up Motif question box (not shown) prompts the user to either save the changes, restore default settings, or quit. The icon which identifies the "exit" pushbutton 514 is the international symbol for "exit" (i.e., a green circle with a vertical white bar on a white background). This symbol is used on all DECspin pop-up windows to indicate the pushbutton that causes the user to exit that particular pop-up window.

Figure 20:
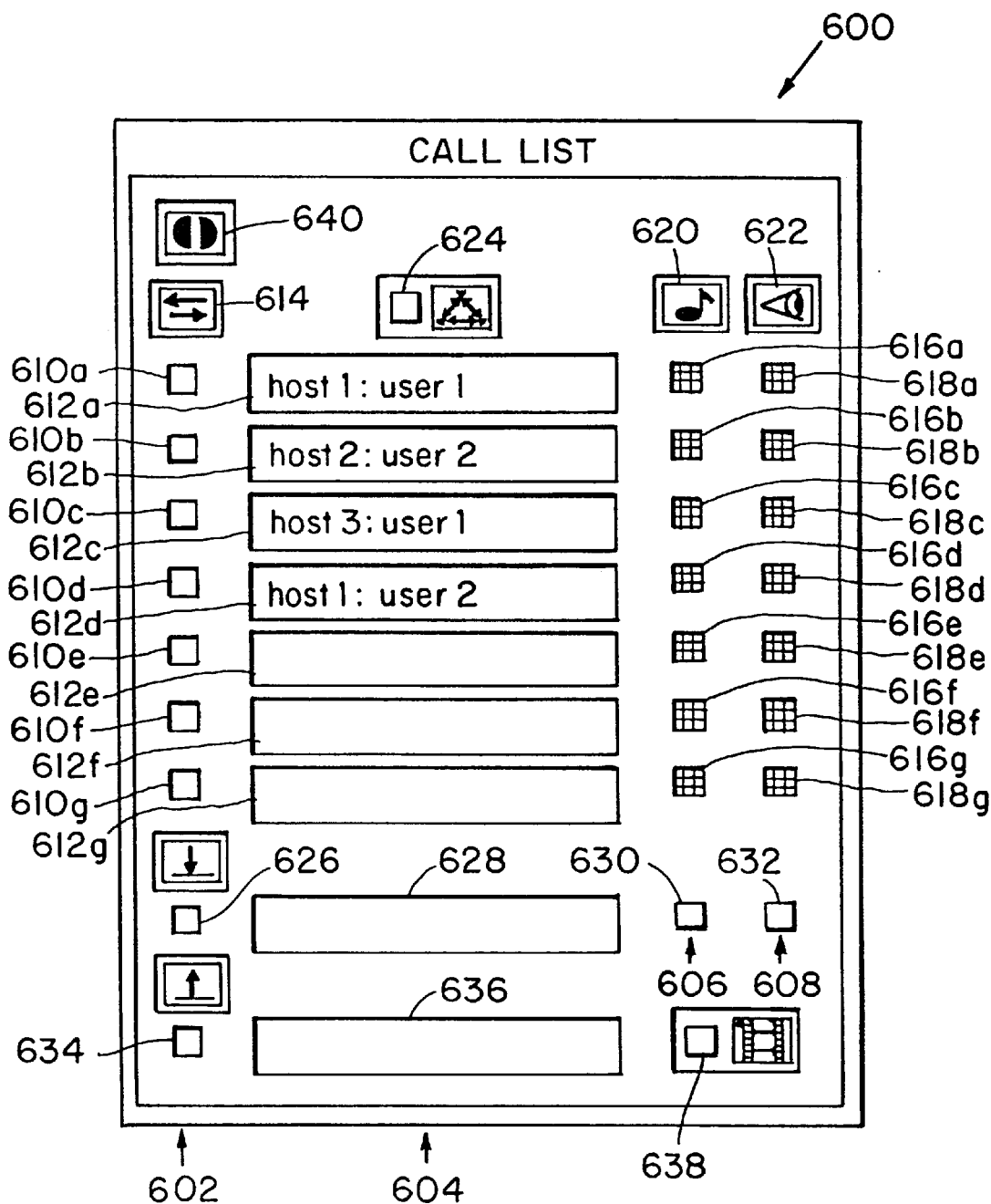
FIG. 20 shows a second level graphical user call list interface window for establishing the video teleconferencing connections to other workstations of this invention.

The "connections" pushbutton 516 is used to establish video teleconference connections between workstations. When activated, this pushbutton causes creation of a second level "call list" pop-up window 600 as shown in FIG. 20. Through the "call list" window the user can add, delete, activate or modify network video teleconferencing connections to other networked workstations. The user can also create and store an audio/video "filmclip" file through this pop-up window. The "connections" pushbutton icon is an international symbol showing a black grid with four intersection points on a white background.

Figure 21:
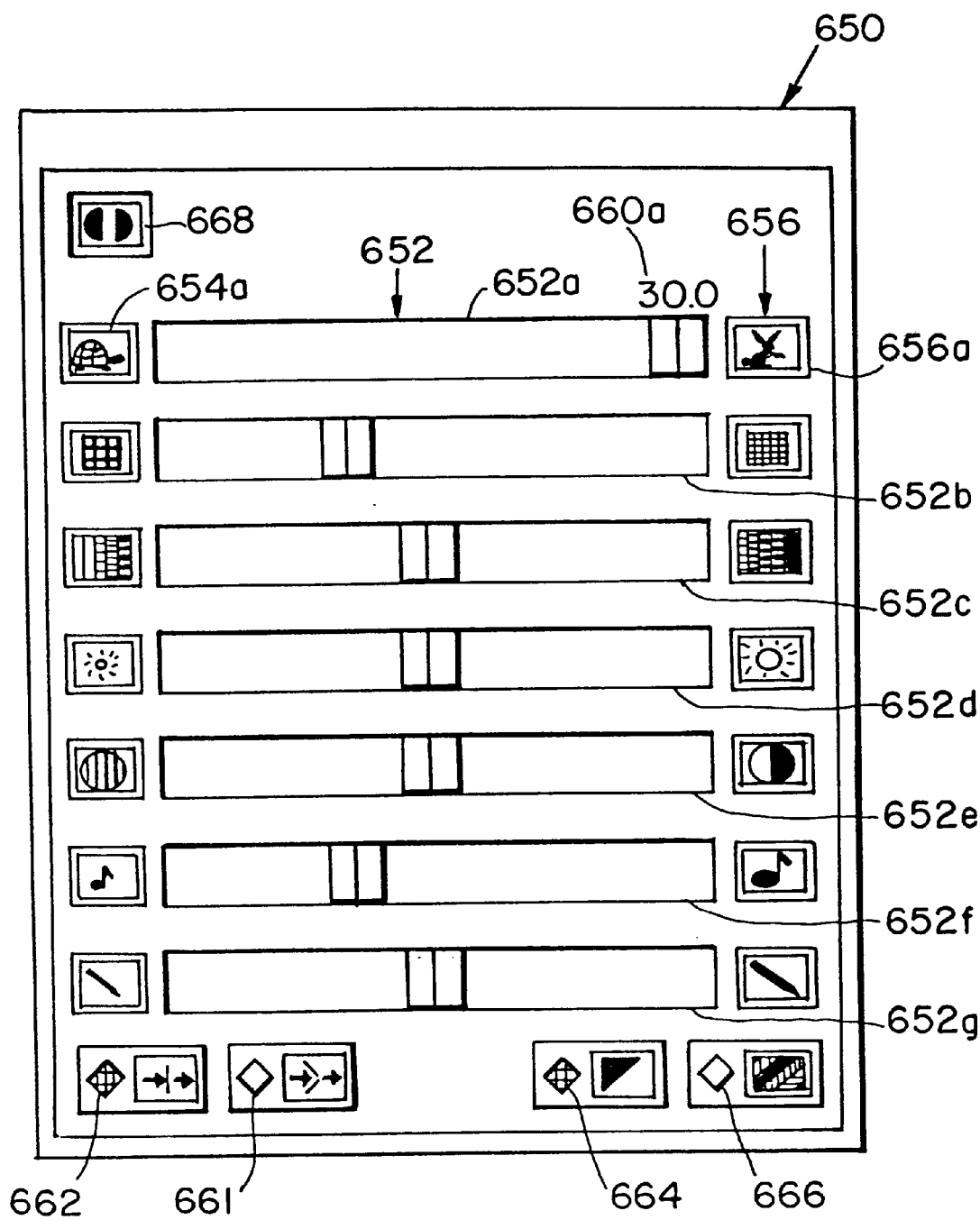
FIG. 21 shows a second level control graphical user interface window for adjusting the parameters for a video teleconference of this invention.

The "control" pushbutton 518 is used to adjust various parameters associated with the audio and video data generated by the workstation and sent to the other video teleconferencing participants. Activation of this pushbutton causes creation of a second level "control" pop-up window 650 as shown in FIG. 21. Through the "control" window the user can adjust transmission parameters including the maximum video frames per second, video hue, video color saturation, video brightness, video contrast, audio volume, and microphone gain. The user can also select between video compression, on or off; color or black and white; and, transmission source, live or stored.

Figure 22:
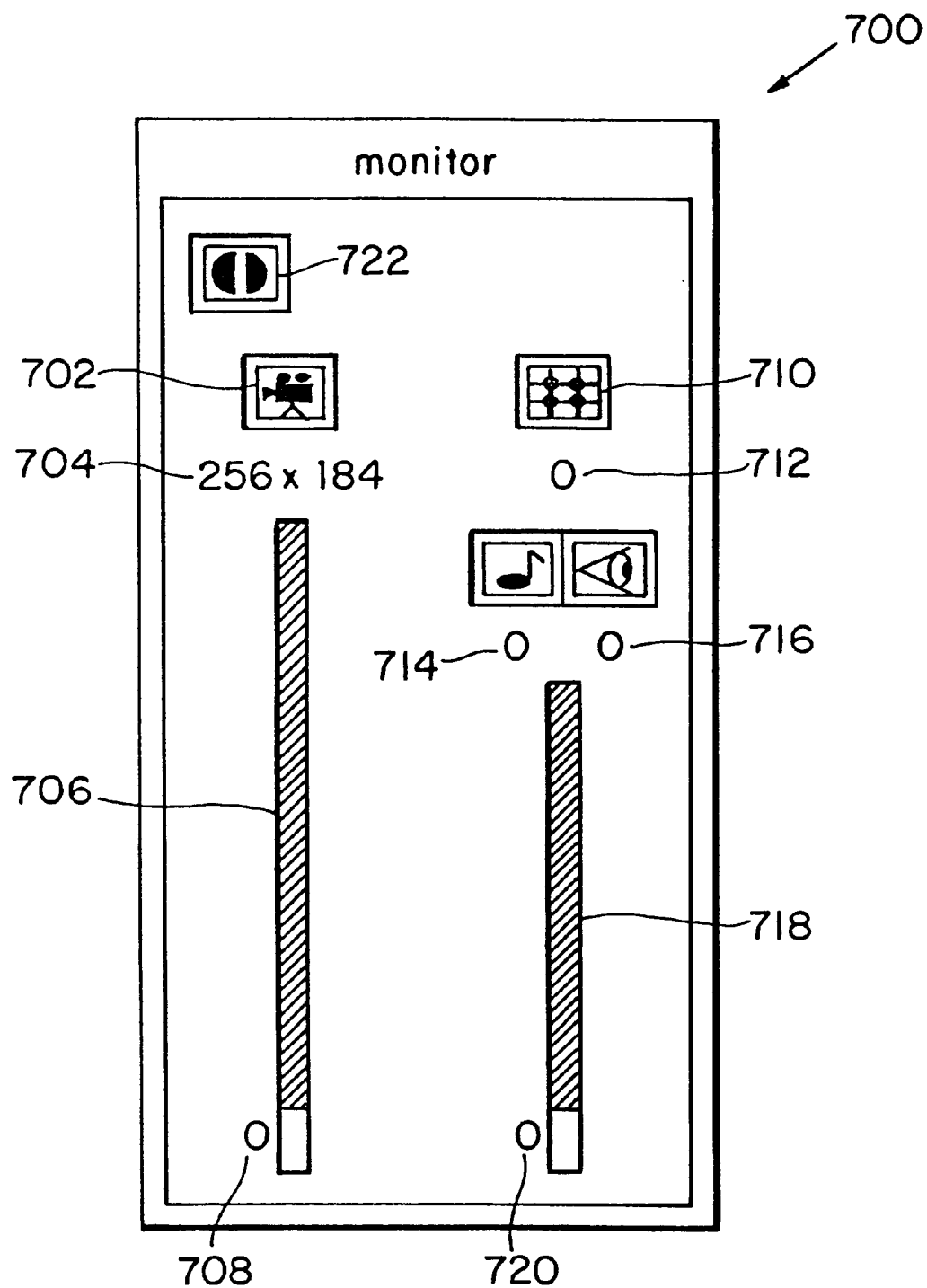
FIG. 22 shows a second level monitor graphical user interface window for monitoring the parameters of a video teleconference of this invention.

The "monitor" pushbutton 520 is used to view various teleconferencing and network system parameters. Activation of this pushbutton causes creation of a second level "monitor" pop-up window 700 as shown in FIG. 22. Through the "monitor" window, the user can monitor the average video frames per second transmission rate, the average network resources consumed by the active DECspin video teleconference, the number of video conference participants, the number of active audio and video connections, and the pixel resolution of the video image generated by the local workstation.

The "help" pushbutton 522 is used to access DECspin on-line documentation. Activation of this pushbutton causes creation of a second level "information" pop-up window 750 as shown in FIG. 23. Through this help window the user can access audio, video and text based information, instruction, and help on various DECspin features, indexed by subtopics. The "help" pushbutton icon is a blue circle on a white background having a white "i" in its center, which is the international symbol for "information".

Referring to FIG. 20, the "call list" window 600 is activated by selecting the "connections" pushbutton 516 (FIG. 18) of the top level DECspin session window. The "call list" window 600 is a Motif pop-up window which is made up mainly of four columns 602, 604, 606 and 608 of Motif widgets. The widgets of the first column 602 include seven "connect" toggle pushbuttons 610*a*–610*g* each associated with a "network host" field 612*a*–612*g*, respectively, in the second column 604. To establish a connection with another workstation, the user enters the target workstation host name and user name into a "network host" field of column 604 and activates the corresponding "connect" toggle pushbutton of column 602 to establish the connection. The syntax for this "host network" field is given as "host:user" for TCP/IP, and as "host::user" for DECnet, respectively. If no user is specified, the DECspin application will attempt to contact anyone logged into the targeted host workstation. The associated "connect" toggle pushbutton of column 602 is activated again to cause disconnection from the target workstation. A "connection" icon 614 located above the "connect" toggle pushbuttons helps to indicate their function to the user.

The widgets of the third and fourth columns 606, 608 include seven "audio" toggle pushbuttons 616*a*–616*g* and seven "video" toggle pushbuttons 618*a*–618*g*, each associated with a "network host" field 612*a*–612*g*, respectively. The "audio" toggle pushbuttons of 616*a*–616*g* of column 606 determine if the associated "network host" will receive audio from the workstation, and the "video" toggle pushbuttons 618*a*–618*g* of column 608 determine if the associated "network host" will receive video from the local workstation. An "audio" icon 620 indicates the function of "audio" toggle pushbuttons 616*a*–616*g*, and a "video" icon 622 indicates the function of "video" toggle pushbuttons 618*a*–618*g*. Thus, the user can establish a connection with another multimedia workstation (target host) by simply indicating the target host name in a "network host" field 612 and activating the associated "connect" toggle pushbutton 610. Once the connection is established, the associated "audio" toggle pushbutton 616 determines if the multimedia workstation will receive audio, and the associated "video" toggle pushbutton 618 determines if the workstation will receive video.

Upon activation of a "connect" pushbutton of column 602, the DECspin application attempts to call the target host workstation over the network. If a connection cannot be made, a Motif error box (not shown) appears on the local monitor and states what error has occurred. The error box may prompt the user for further instructions, such as retry or cancel.

"Call list" window 600 also includes a "join" pushbutton 624 which, when activated, joins all "network hosts" currently connected to the local workstation into a single video teleconference. This produces an n-way video teleconference between all the network hosts connected to the workstation as indicated by an activated (highlighted) "connect" toggle pushbutton 610*a*–610*g*.

The "call list" window 600 also allows the user to redirect audio and video to and from a multimedia file. An output file "connect" toggle pushbutton 626 activates a connection to an output file as specified in an associated output file descriptor field 628. If an output file connection is activated while a teleconference is in progress, a copy of the outgoing transmission from the local workstation is stored to the specified output file. An "audio" toggle pushbutton 630 and a "video" toggle pushbutton 632 associated with the output file descriptor field 628 respectfully determine if audio, video, or both audio and video will be stored to the output file. The audio and video data is stored to the designated output file until the output file "connect" toggle pushbutton is deactivated.

An input file "connect" toggle pushbutton 634 activates playback of an input file containing pre-recorded audio and/or video data, possibly stored earlier by means of the output file "connect" toggle pushbutton discussed above. The input file is specified in an input file descriptor field 636 associated with the input file "connect" toggle pushbutton 634. Furthermore, if the input file is selected for playback while a video teleconference is in progress, the contents of the file are also sent to the conference members as indicated by the active "connect" toggle pushbuttons 610*a*–610*g*. In this manner, an audio/video data stream can be sent to and viewed by all conference members simultaneously.

A "filmclip" pushbutton 638 allows a user to view DECspin audio/video messages stored as .SPN files in the conventional system message area, described below. Activation of this pushbutton causes a Motif "file selection box" pop-up window (not shown) to appear which allows the user to select a message file for playback. The message is played back by running the stored audio and video data through a local DECspind application as if the data streams were being sent to the DECspind application by a remote DECspin application.

Finally, the "exit" pushbutton 640 of "call list" 600 terminates the "call list" pop-up window and returns the user to the active teleconference windows established by means of the "call list" window.

When a call is placed to a target host by activating a "connect" toggle pushbutton a "ring box" pop-up window 800 as shown in FIG. 25 appears on the display of the remote workstation being called. Simultaneously, the keyboard bell of the target host workstation is "rung". A DECspind application window 850, shown in FIG. 19, is also displayed on the remote workstation, but with inactive video. The "ring box" window indicates to the user of the target host workstation that a video teleconference call is being attempted with that workstation. The title bar 802 of the "ring box" identifies the calling host workstation and the user who placed the call. No other information (including audio and video) is revealed to the called party unless the call is answered.

The "ring box" 800 offers the called party an "answer" pushbutton 804 and a "busy" pushbutton 806. If the called party activates the "answer" pushbutton, the target workstation will use a local DECspin application to return audio and video to the calling workstation, and will display the received video in the DECspind application window 850 shown in FIG. 19. The received audio is audibly reproduced by the DECspind application. This completes the two-way video teleconferencing connection between the calling and the called workstations.

If the called party activates the "busy" pushbutton 806, the calling party is informed that the called target workstation is busy. Furthermore, the called party can ignore the "ring box". In this case, if there is no answer after a set period of time, e.g., four rings, the calling party is prompted to take further action, such as leave a message or close the call. Still further, the called party can simply "hang up" by activating the "exit" pushbutton 856 of the DECspind application window of FIG. 19.

If a called party does not answer within a predetermined time period, answers busy, or just hangs up, the calling party is prompted with a Motif information box (not shown) which allows the caller to leave a short audio/video message on the called workstation. This feature works like an answering machine. Alternatively, the caller can be shown a "greetings filmclip" previously stored by the called party which asks the caller to leave an audio/video message on the called workstation.

The maximum length of the message is preset to a reasonable period of time, dependent on the file storage resources of the target system. In one preferred embodiment, the maximum message length is limited to 20 seconds, and is not changeable by the user. The user is presented with a pop-up Motif "countdown" box (not shown) which provides a running indication of the amount of time left while leaving a message.

Messages may be stored in the conventional system message area with, for instance, a .SPN file descriptor extension. Once the caller elects to leave an audio/video message, the DECspin application of the calling workstation directs the audio and video data streams meant for the called workstation to a message "filmstrip" file. Upon invocation of the DECspin application, the system message area is checked for any stored .SPN message files. If any are present, the user is presented with a pop-up Motif "file selection box" window (not shown) which allows the user to select and playback any of the stored messages. The message is played back by running the stored audio and video data streams through a DECspind application as if the data streams were being sent by an active DECspin application. Message files may also be discarded through this pop-up window. Furthermore, the system message area can be checked for .SPN message files at any time by activating the "filmclip" pushbutton 638 of the "call list" window 600.

Referring to FIG. 21, the "control" pop-up window 650 is activated by selecting the top level "control" pushbutton 518 (FIG. 18) of the DECspin session window 510. The "control" window is a Motif pop-up window which is made up mainly of a column 652 of sliding scale widget controls, and a column of corresponding icons 654 and 656 located on either side of the sliding scale widgets to indicate the function of the associated sliding scale widget. For instance, the top most sliding scale widget 652a adjusts the maximum video frame rate for the video teleconference. The video frame rate sliding scale widget includes a control gadget 658a which may be moved with the mouse along the length of the sliding scale widget to adjust the maximum frame rate. A digital readout 660a above the sliding scale moves with the control gadget and displays the current frame rate setting. The left side icon 654a shows a "snail" to indicate movement of the control gadget to the left slows the frame rate. Conversely, the right side icon 656a shows a "hare" to indicate movement of the control gadget to the right increases the frame rate.

The remaining sliding scale widgets 652b–652g operate in a similar manner to effect their respective controls. Scale 652b–652g respectively control color hue (red on left, green on right), color saturation, brightness, contrast, audio volume, and microphone gain. Furthermore, "control" window 650 includes two pushbuttons 660 and 661 for enabling and disabling video compression, respectively. Two other pushbuttons 664 and 666 enable black and white, or color video, respectively. Finally, an "exit" pushbutton 668 terminates the "control" window.

Referring to FIG. 22, the "monitor" pop-up window 700, activated by selecting the top level "monitor" pushbutton 520 (FIG. 18) of the DECspin application window 510. The "monitor" window is a Motif pop-up window which includes graphic indicators for displaying certain video teleconferencing parameters and statistics. The displayed statistics are updated periodically, for instance, every five seconds.

Information related to the video image generated by the DECspin application is displayed below a "camera" icon 702. The video image information includes a digital readout 704 of the video image size in horizontal by vertical pixels, and a sliding scale indicator 706 with an associated digital readout 708 for showing the average frame rate. These two parameters are important since the DECspin video window 524 of FIG. 18 may be "sized", as discussed above, to change the number of pixels contained in the image. Changing the number of pixels also effects the video frame rate. Both these video parameters can be monitored by these indicators as the DECspin window is sized.

Information related to the network and active video teleconference is displayed by indicators located below a "connection" icon 710. This information includes digital readouts of the total number of active teleconferencing connections 712, the number of active audio connections 714, and number of active video connections 716. Finally, a sliding indicator 718 and an associated digital readout 720 display the average network consumption. An "exit" pushbutton 722 terminates the "monitor" pop-up window.

Referring to FIG. 23, the "information" pop-up window 750 is activated by selecting the "help" pushbutton 522 (FIG. 18) of the top level DECspin session window 510 and allows the user access to textual and "filmclip" documentation for the DECspin application. The "information" window is a second level Motif pop-up window which is made up of a column 752 of user selectable pushbuttons configured as a Motif Radio Box so that only a single pushbutton can be activated at one time. Each pushbutton is labeled with a sub-topic for which help documentation is available. For instance, in the embodiment of FIG. 23, help documentation is available to provide an overview of the video teleconferencing system 754, to help start a conference 756, to help with a specific video teleconferencing feature 758, or to help troubleshoot a video teleconferencing problem 760. Upon activation of one of the topic pushbuttons, a third level "sub-help" window 780 of FIG. 24 appears offering the user a further breakdown of subjects related to the selected topic. For instance, the "sub-help" window of FIG. 24 shows the subjects available to the user after selecting the overview pushbutton 754 of FIG. 23.

The "sub-help" window 780 of FIG. 24 is a third level Motif pop-up window having a column of pushbuttons 782 and 784 on each side of a center column 786 of subject labels. The left column of pushbuttons 782 activates a bookreader textual documentation system for the corresponding subject. For instance, activation of pushbutton 788 will present the user with text on the workstation display describing an introduction to the video teleconferencing system. The right column of pushbuttons 784 activates a "filmclip" for the corresponding subject. For instance, activation of pushbutton 790 will open another DECspind window on the display through which a "filmclip" demonstration will be played back to the user.

The help system thus described offers the user three levels of comprehensive textual, audio and visual system documentation. At the first level, the "talking keys" offer the user quick access to audio information about a function available for selection by the user. At the second level, the pop-up "information" window helps to narrow the user's help requirements to a specific topic. At the third level, the pop-up "sub-help" window offers the user textual and/or audio/visual documentation on a variety of subjects related to the selected second level topic.

Furthermore, the file storage structure for the help documentation adds a high degree of flexibility to the audio/visual documentation system of this invention. For instance, each "audio clip" of the "talking key" help function is stored in a separate key-specific file which is played back when the talking help function is activated. Thus, if the function of a key changes, only a single audio file needs to be updated. Furthermore, the audio help system can be easily internationalized by providing an "audio clip" file set corresponding to the desired foreign language. This also applied to the textual and "filmclip" documentation which is stored in separate subject-specific files. Thus, if a system function changes, only the text and/or "filmclip" files affected by the change need to be updated. Although this audio/visual documentation system has been described with reference to the video teleconferencing application of this invention, it will be apparent to those skilled in the art that such an audio and/or visual help system can be provided on a multi-media workstation or PC for virtually any type of application.

Figure 26B:
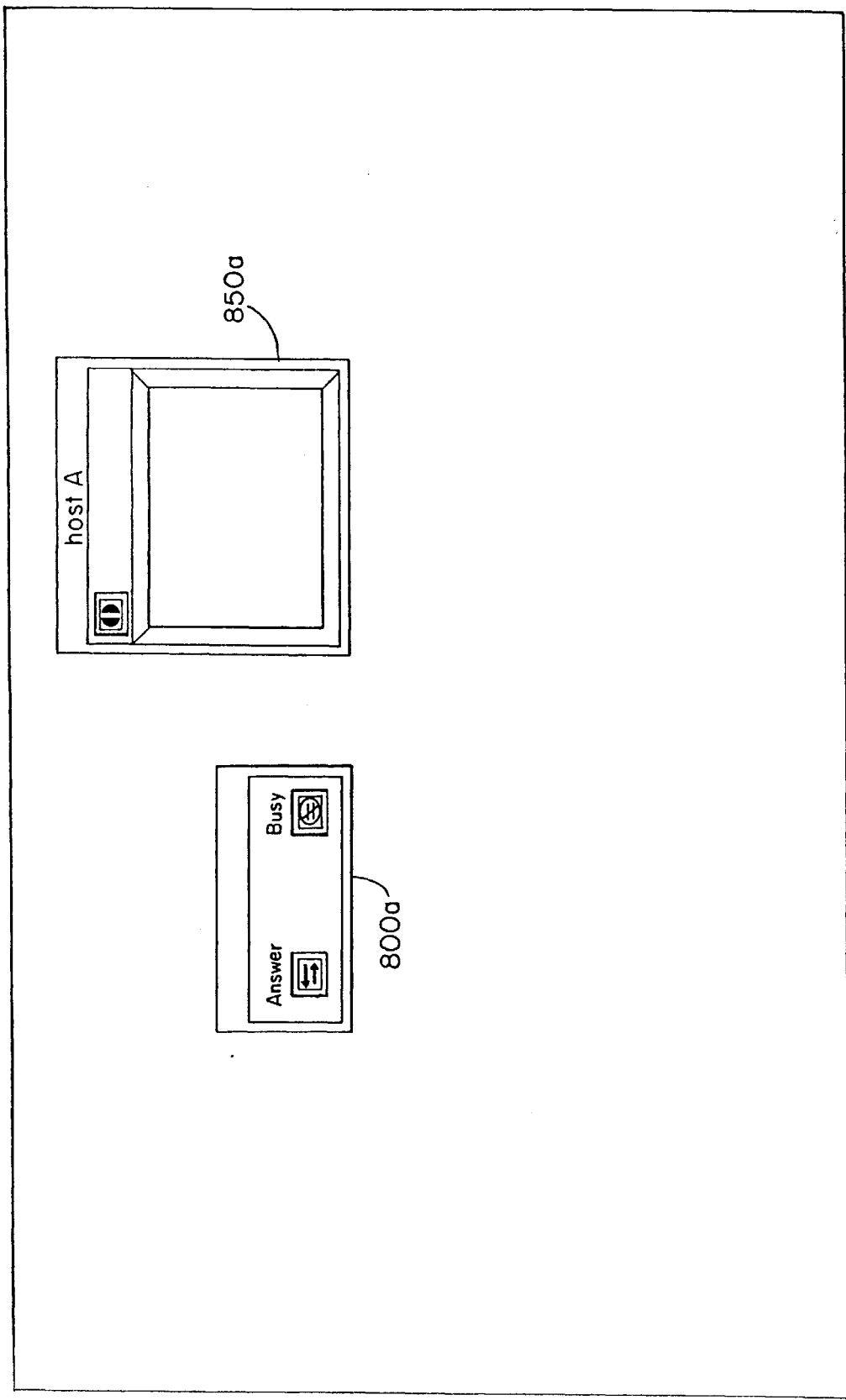

FIGS. 26(a)–26(k) show the display screens of three workstations, Workstation A (30a), Workstation B (30b), and Workstation C (30c) during the initiation of a typical three-way video teleconference using the Graphical User Interface of this invention. FIG. 26(a) shows a typical display 30a for Workstation A after the DECspin application has been invoked but before the initiation of a video teleconference. This display shows a DECspin session window 510a for monitoring the local video generated by Workstation A. The user of Workstation A has activated the "call list" window 600a, the "control" window 650a, and the "monitor" window 700a.

The user of Workstation A initiates a video teleconference call to Workstation B ("host B") by activating pushbutton 610a of the "call list" window. FIG. 26(b) shows the display 30b of Workstation B after Workstation A places the call. A "ring box" 800a and a blank DECspind session window 850a, identifying the calling party ("host A") appear on the Workstation B display. The user of Workstation B answers the video teleconference call by activating the answer pushbutton of "ring box" 800a.

Figure 26C:
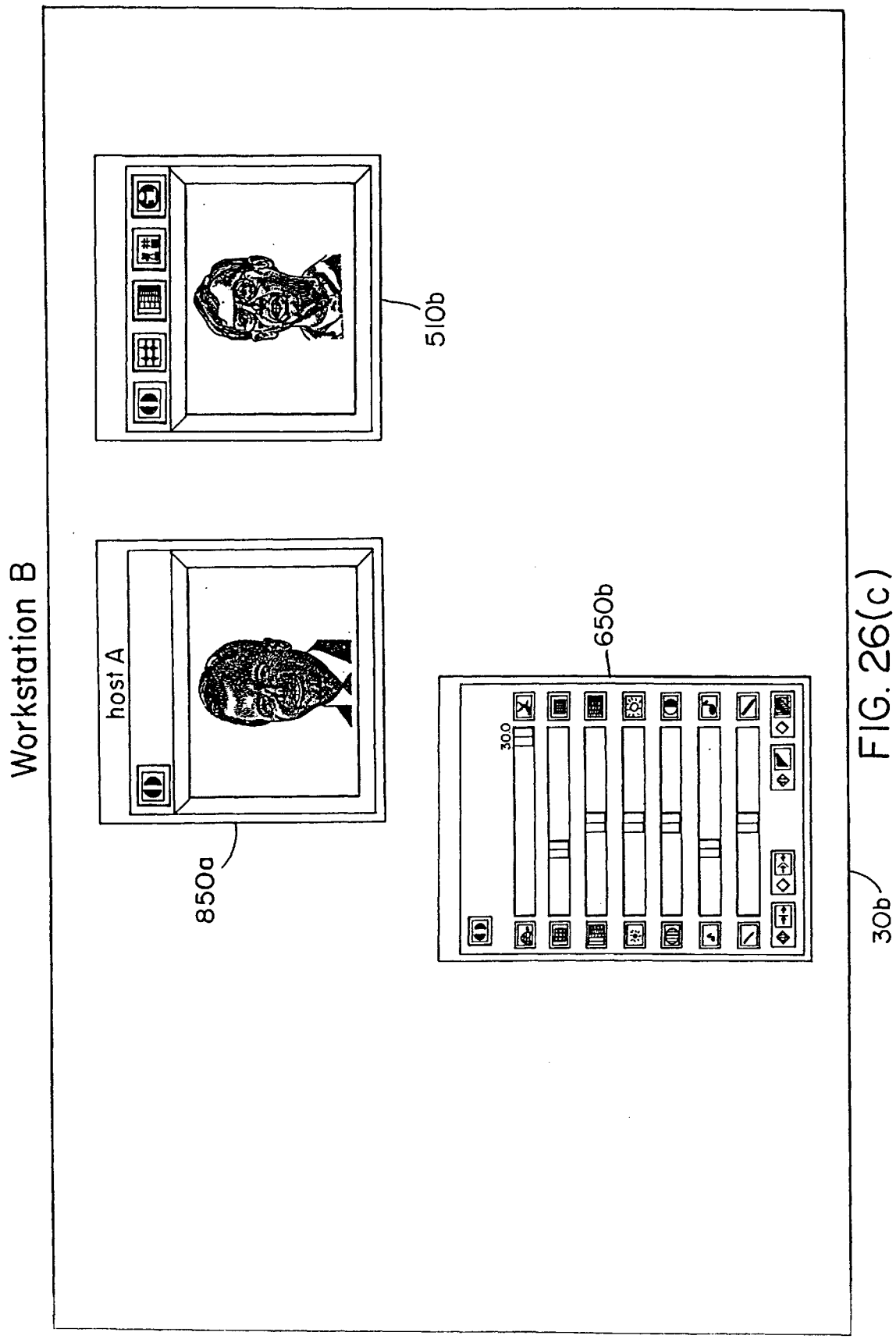
Figure 26D:
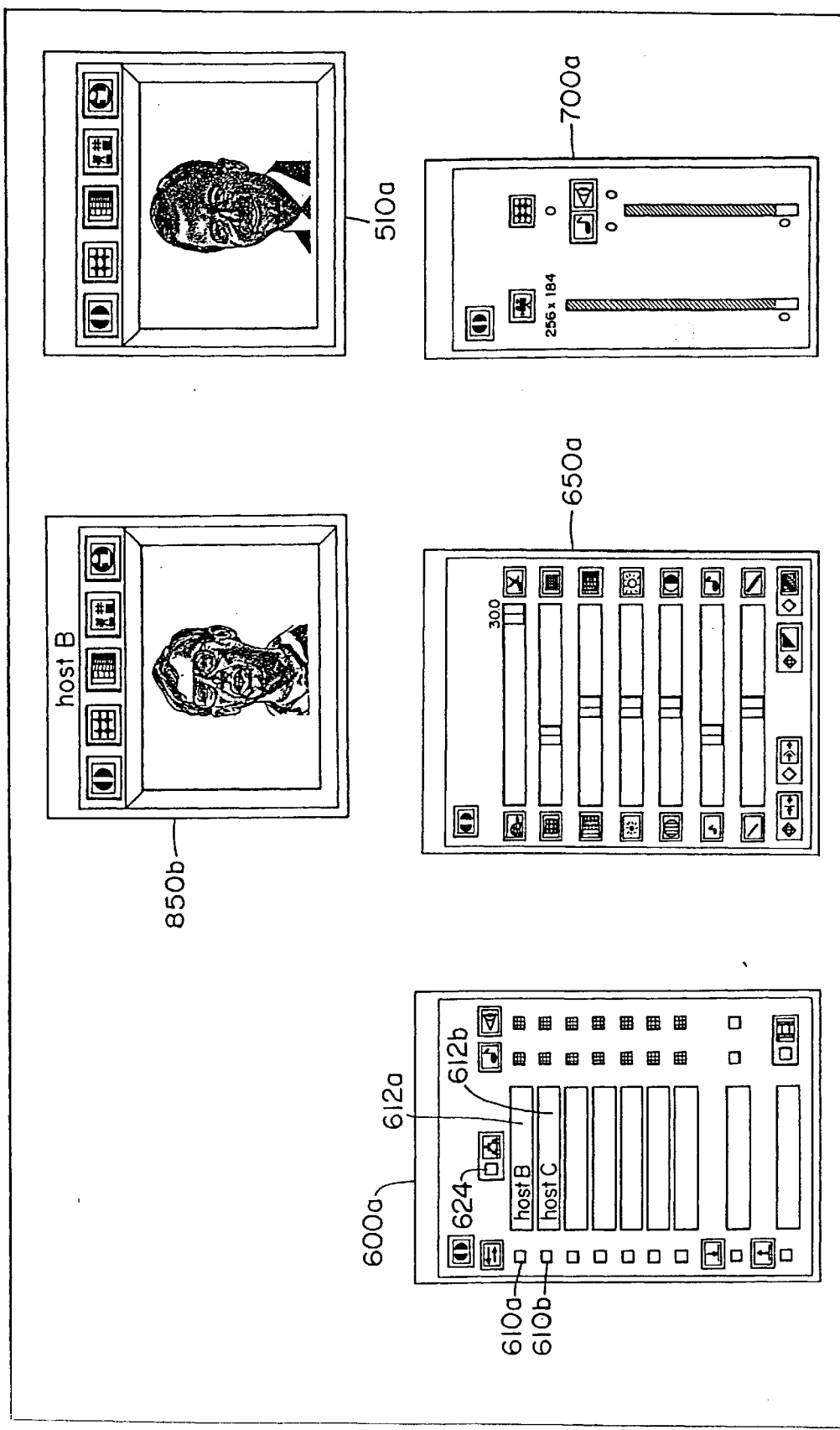

FIG. 26(c) shows the display 30b of Workstation B after the user answers the call from Workstation A. Here, the video (and audio) of the host A DECspind session window 850a has been activated. Further, a local DECspin session window 510b appears to allow the user of Workstation B to monitor the local video signal. Here also, the user of Workstation B has invoked the "control" window 650b from the DECspin session Window 510b. FIG. 26(d) shows the display of Workstation A after Workstation B has answered the video teleconference call. A host B DECspind window 850b provides return video from Workstation B to Workstation A.

The user of Workstation A initiates a video teleconference call to another user on Workstation C ("host C") by activating pushbutton 610b of the "call list" window 600a.

Figure 26E:
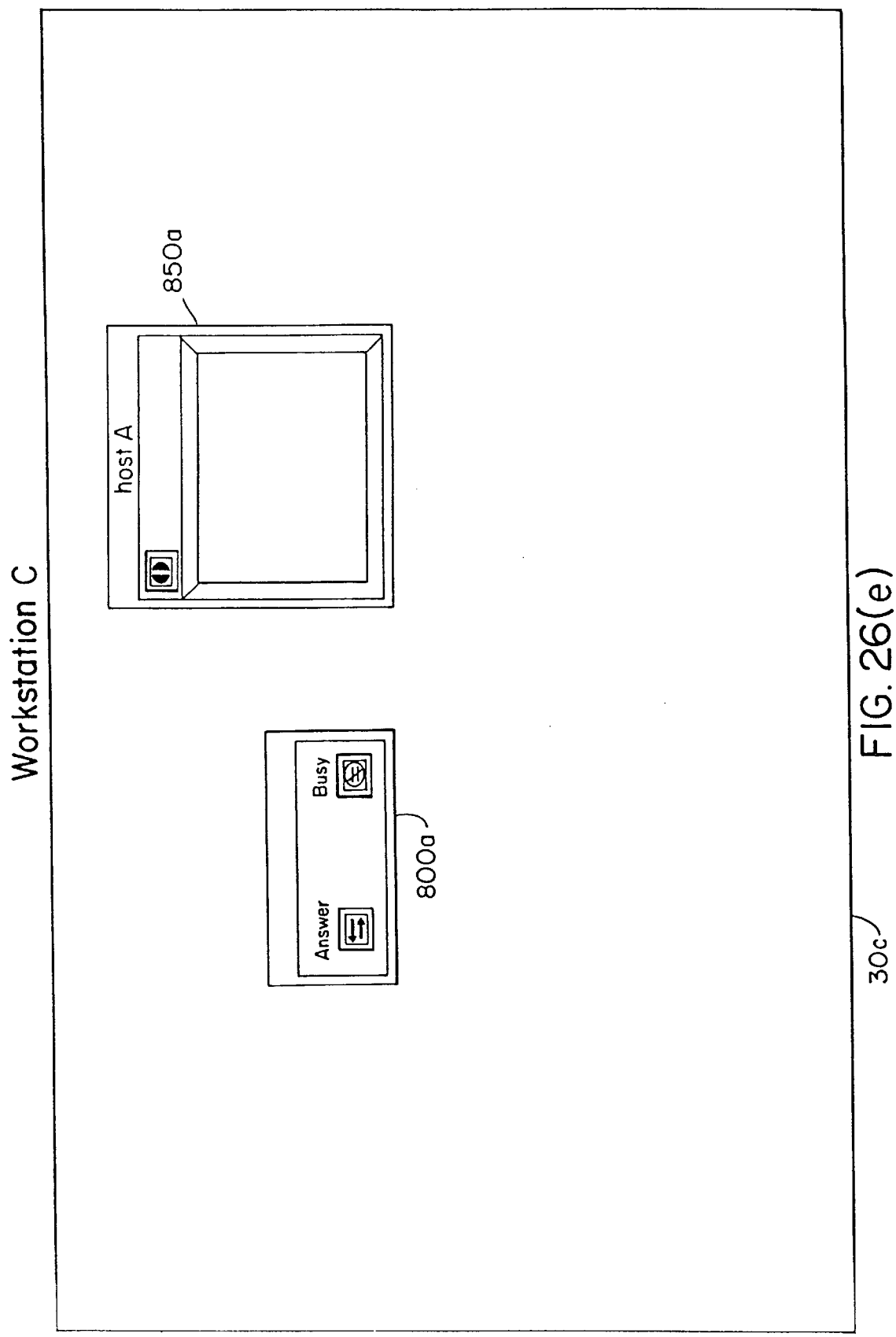
Figure 26F:
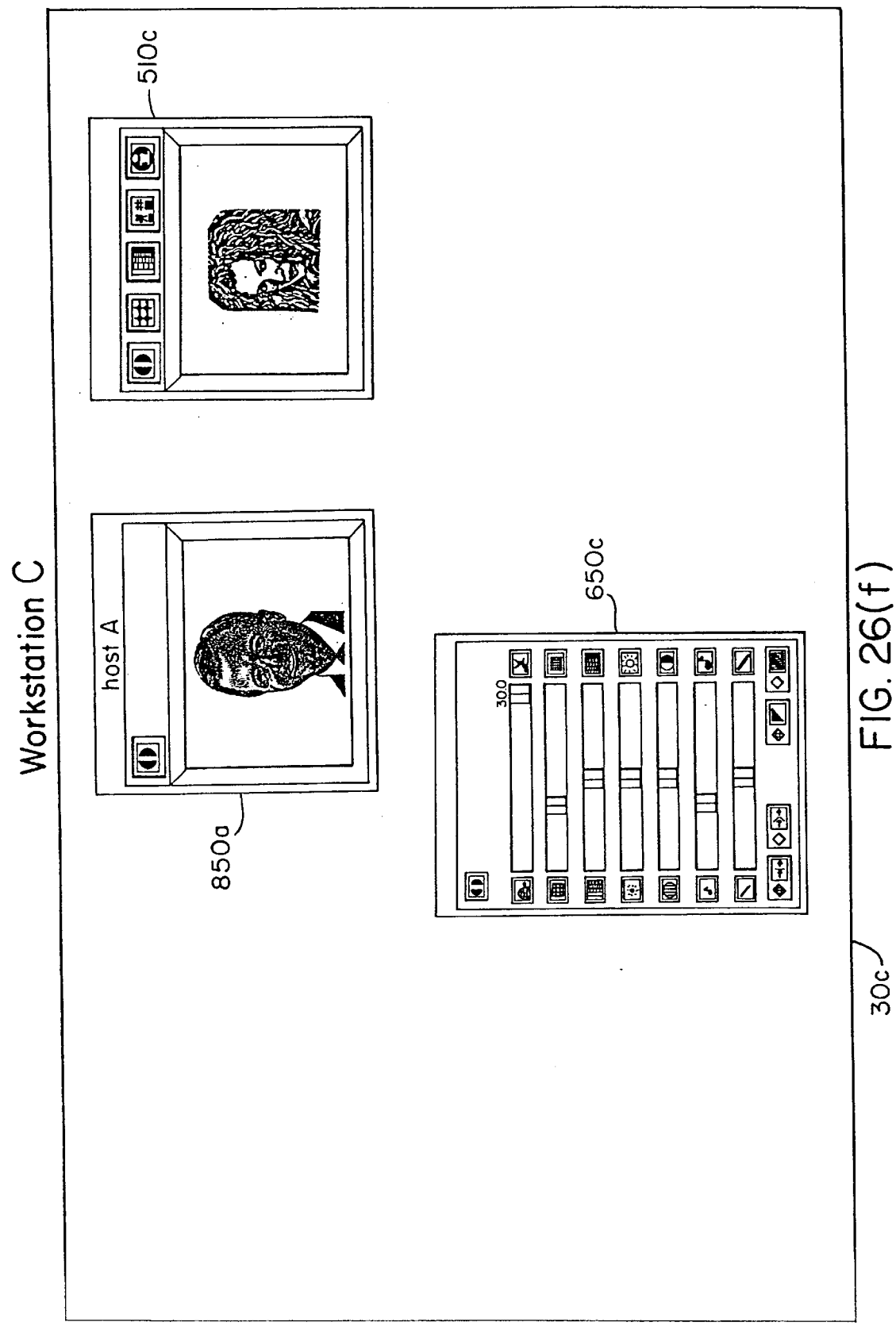
Figure 26G:
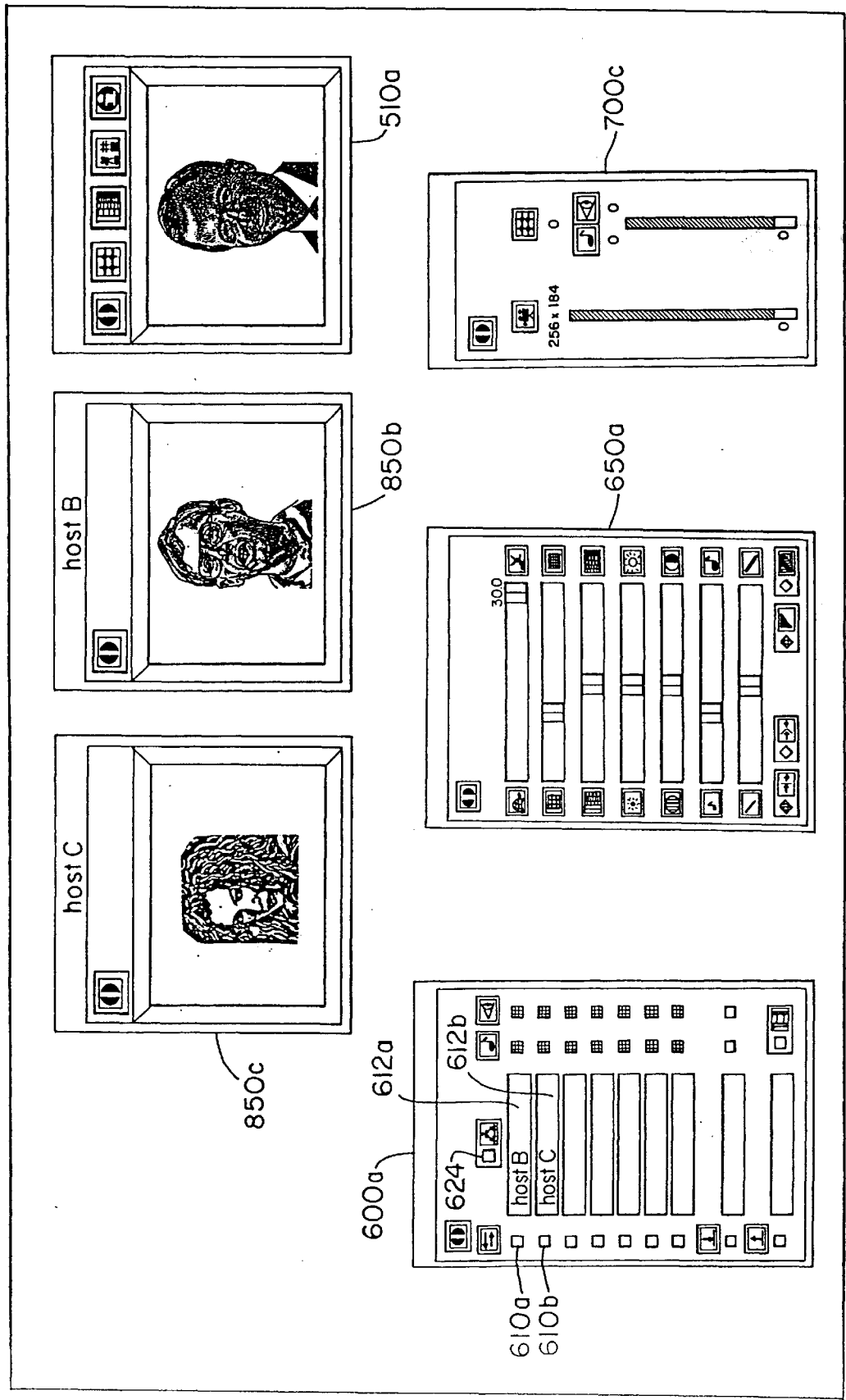

FIGS. 26(e) and 26(f) show the display 30c of Workstation C after Workstation A places the call, and after Workstation C answers the call, respectively. Here again, the user answering the call to Workstation C causes the invocation of a local DECspin session window 510c to monitor local video from Workstation C. FIG. 26(g) shows the display 30a of Workstation A after the user of Workstation C answers the call. A host C DECspin session widow 850c displays the return video from Workstation C to Workstation A.

Figure 26H:
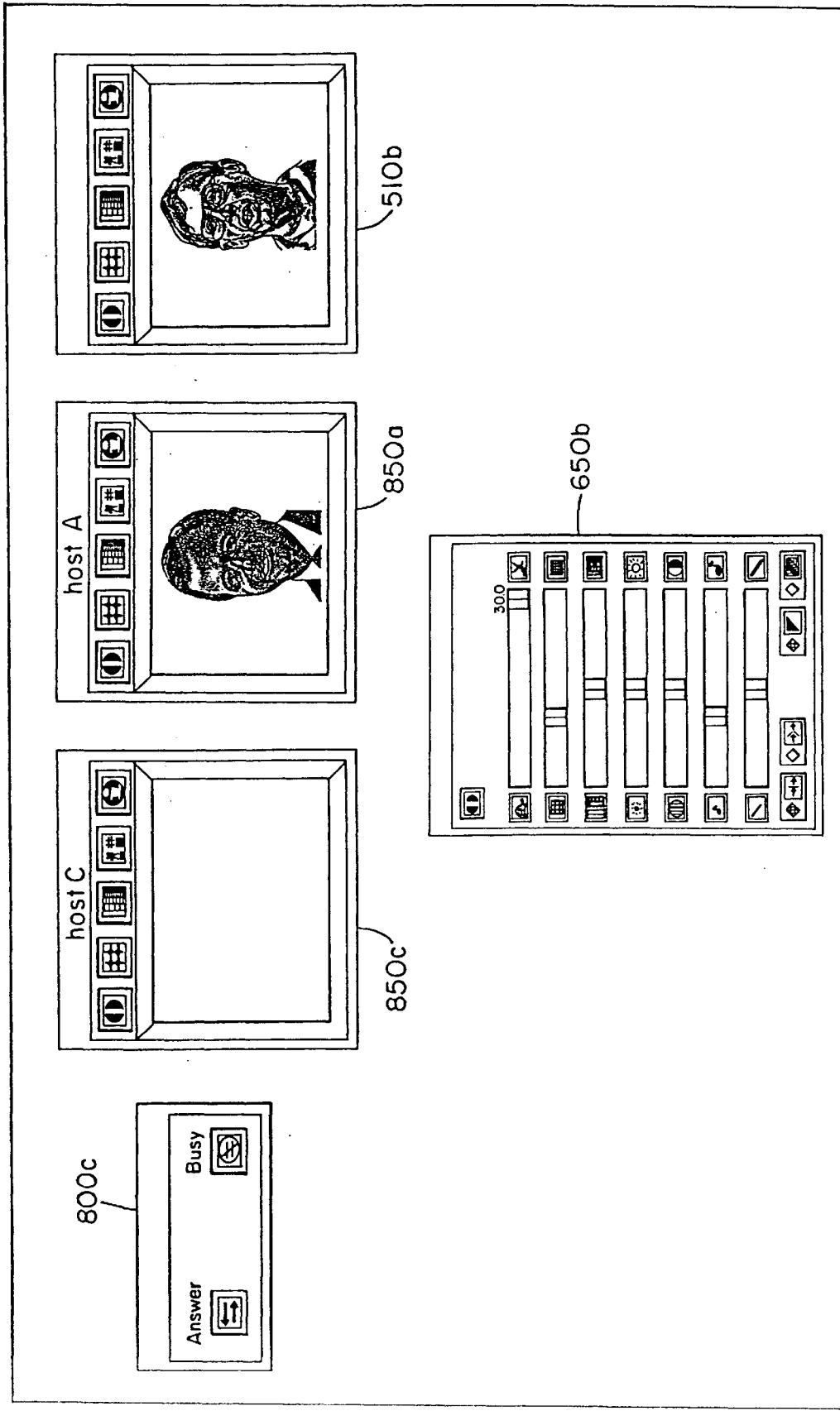
Figure 26I:
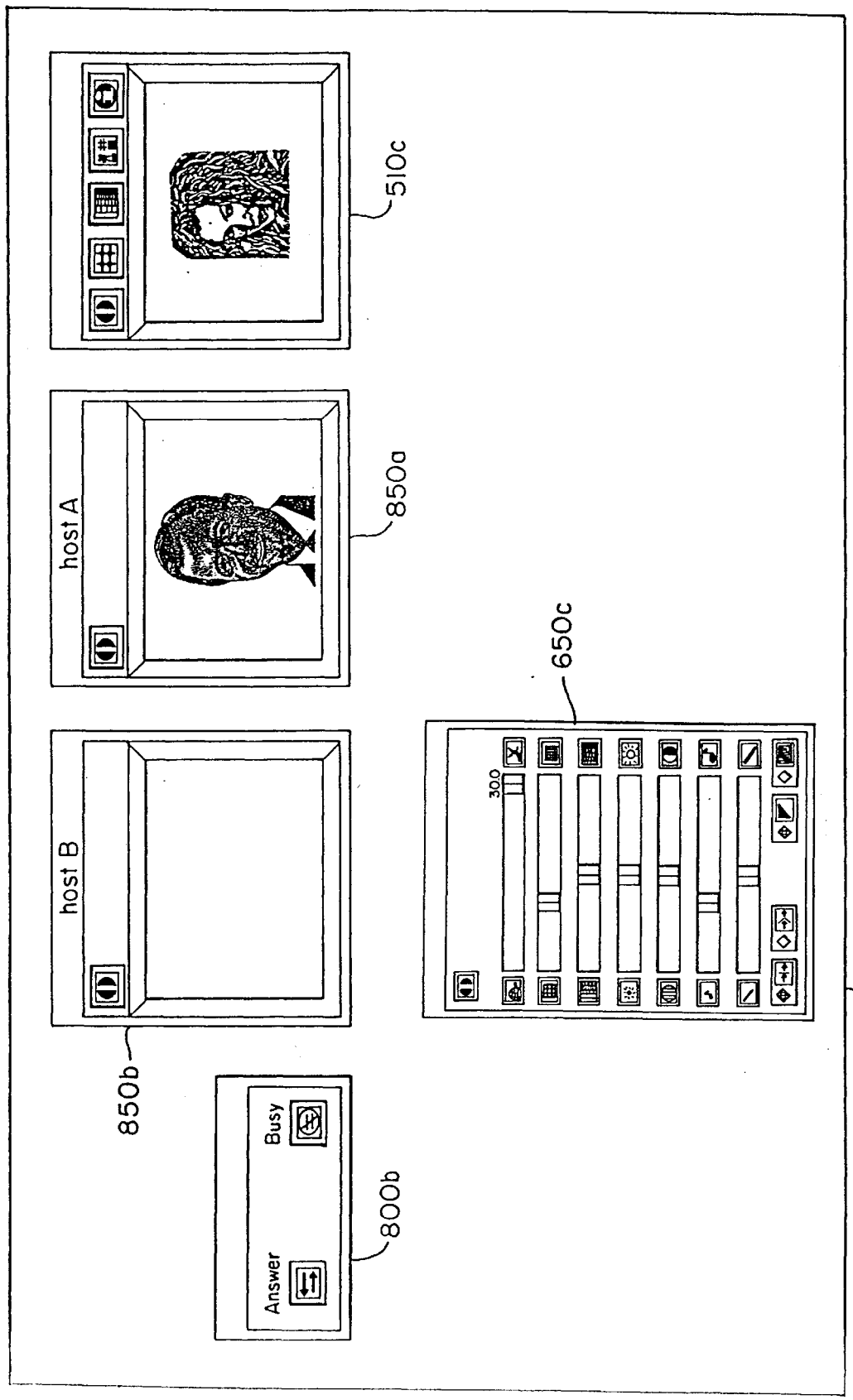

At this point the user of Workstation A can join the users of Workstation B and Workstation C into a three-way conference by activating the "join" pushbutton 624 of the "call list" window 600a. Upon activation of the "join" pushbutton, Workstation B is caused to place a video teleconference call to Workstation C, and vice versa. FIGS. 26(h) and 26(i) show the display of Workstation B and Workstation C, respectively, after the call is placed, but before it is answered. A "ring box" and blank DECspind application session window from Workstation C (800c and 850c) appear on the display of Workstation B (FIG. 26(h)) and a "ring box" and blank DECspind application session window from Workstation B (800b and 850b) appear on the display of Workstation C (FIG. 26(i)).

Figure 26J:
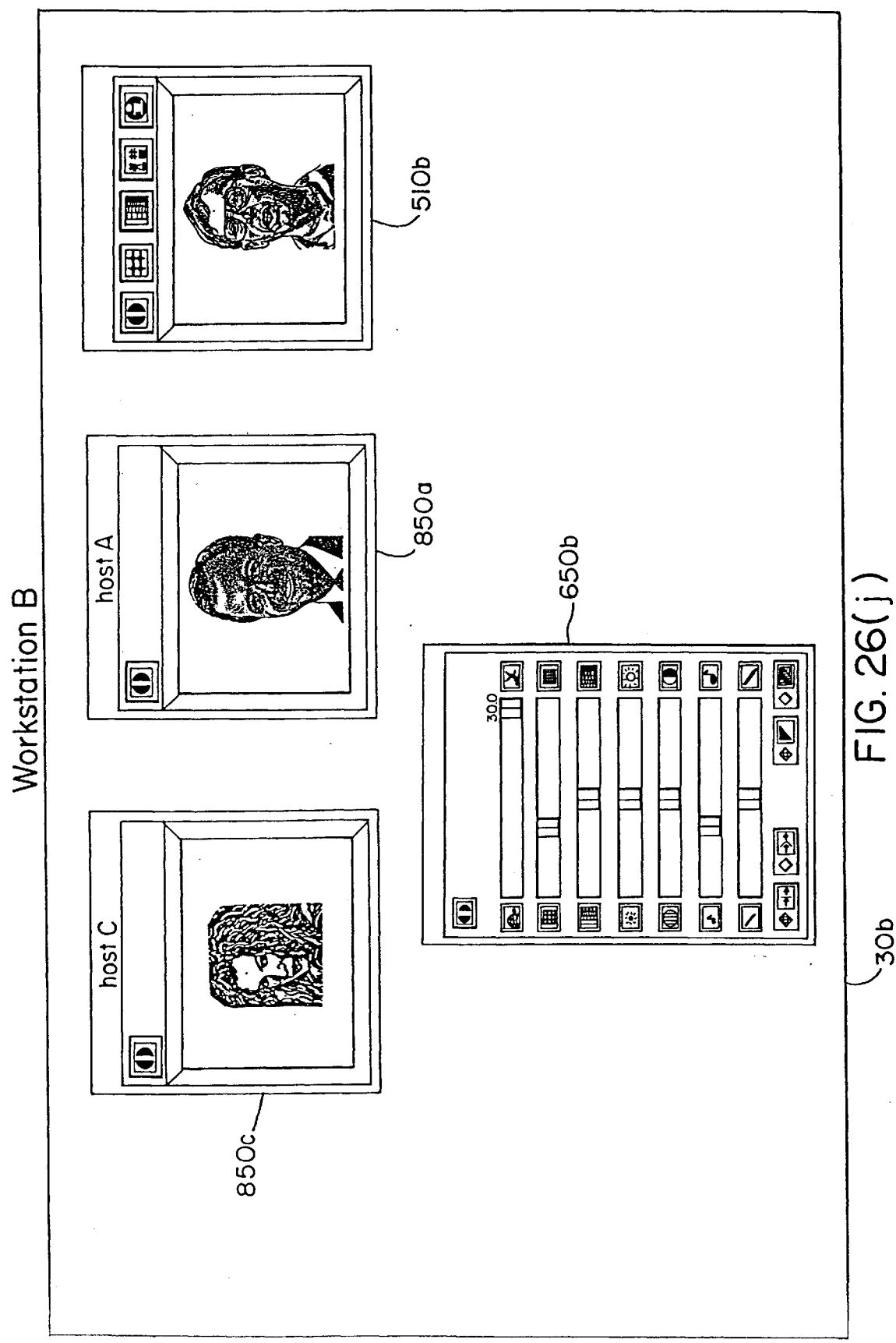
Figure 26K:
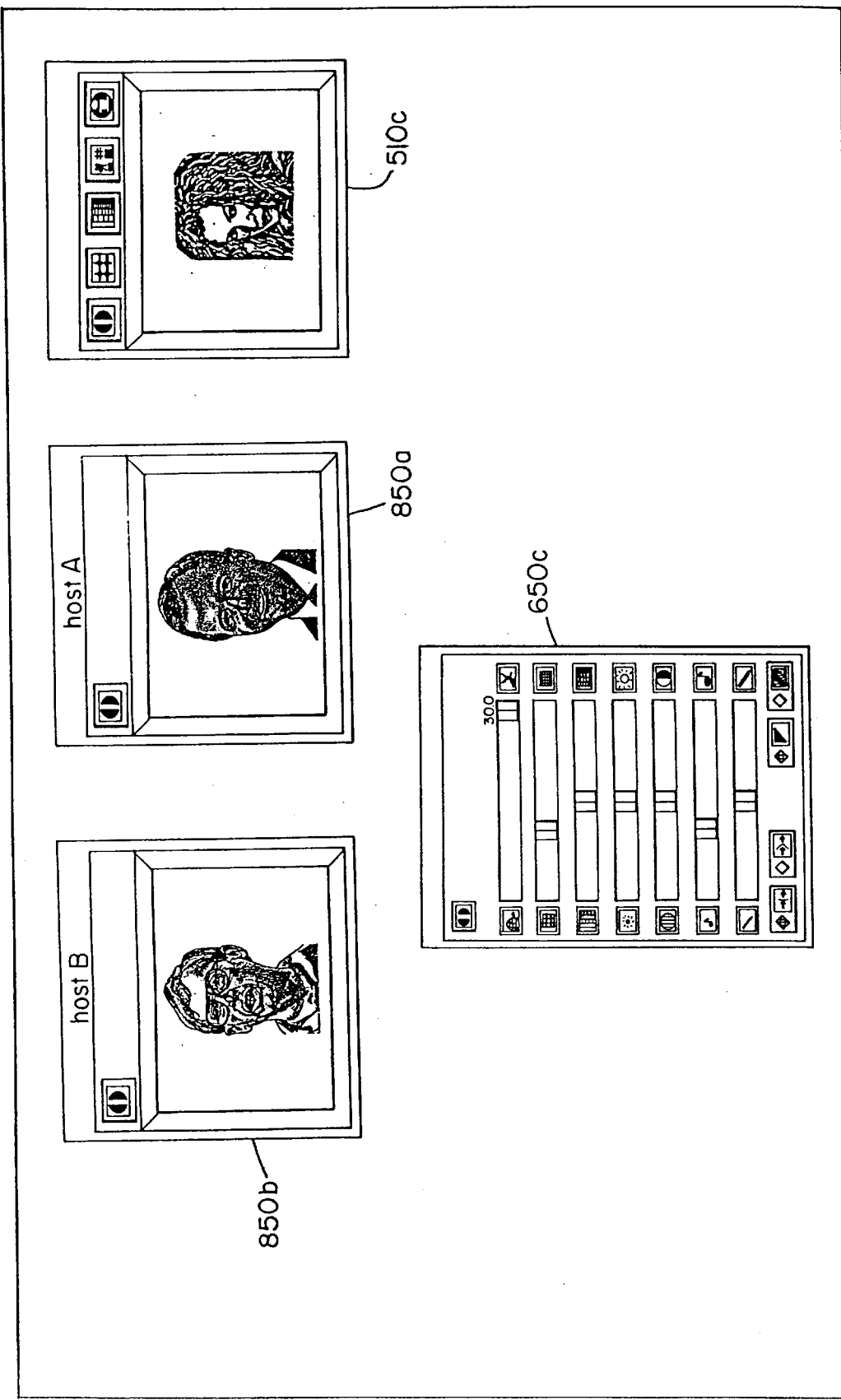

FIGS. 26(j) and 26(k) show the display of Workstation B and Workstation C, respectively, after the user of each workstation has answered their respective "ring box" of FIGS. 26(a) and 26(i). Thus, FIGS. 26(g), 26(j) and 26(k) show the resulting display of Workstations A, B, and C, respectively, when all are joined into a three-way video teleconference.

Pixel Decimation and Replication

Figure 27:
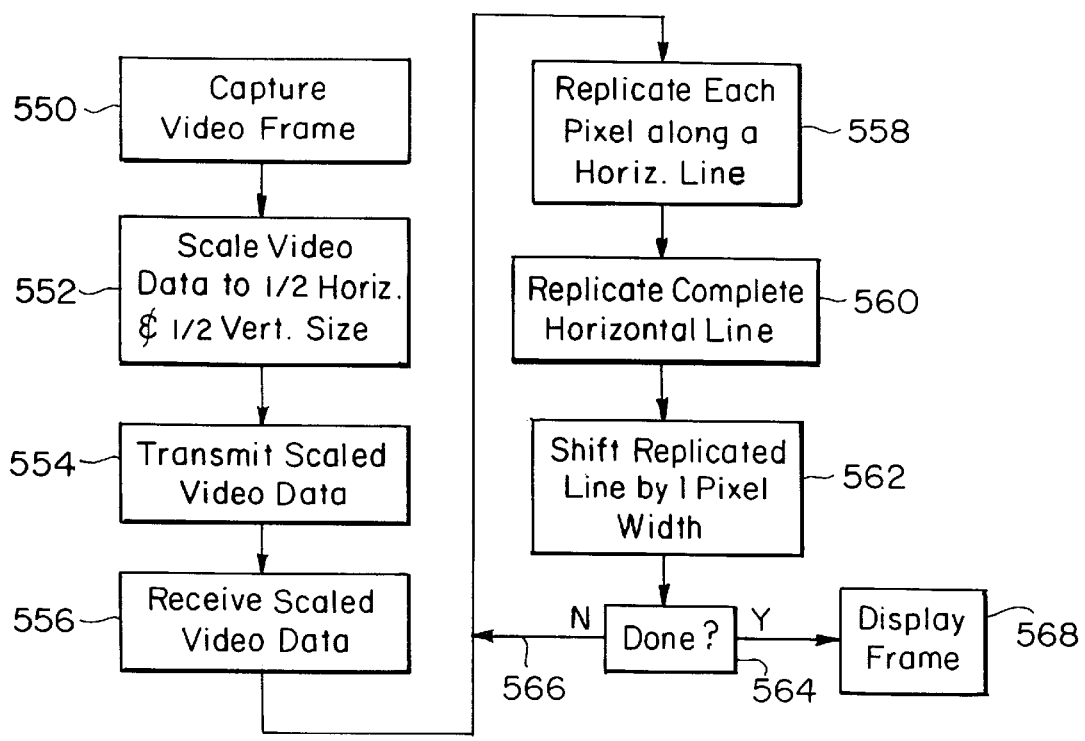
FIG. 27 is a flowchart showing the pixel decimation and replication video compression technique of this invention.

FIG. 27 shows a flowchart of a process for implementing the Pixel Decimation and Replication (PDR) video compression technique of this invention. This technique is especially attractive as an inexpensive alternative to video compression techniques, such as JPEG or MPEG, which typically require dedicated hardware support.

Specifically, the frame grabber 34 (FIG. 2) Captures 550 a video frame in the video buffer 35 (FIG. 2), and proceeds to scale 552 by ½ the video data in the horizontal and vertical directions. In the preferred embodiment, the scaling is accomplished by a mechanism internal to the particular video grabber in response to a "scale" command. However, generally, the scaling can be accomplished by producing a "scaled" pixel based on the contents of the pixels it replaces, e.g., by implementing a pixel averaging function.

Figure 28A:
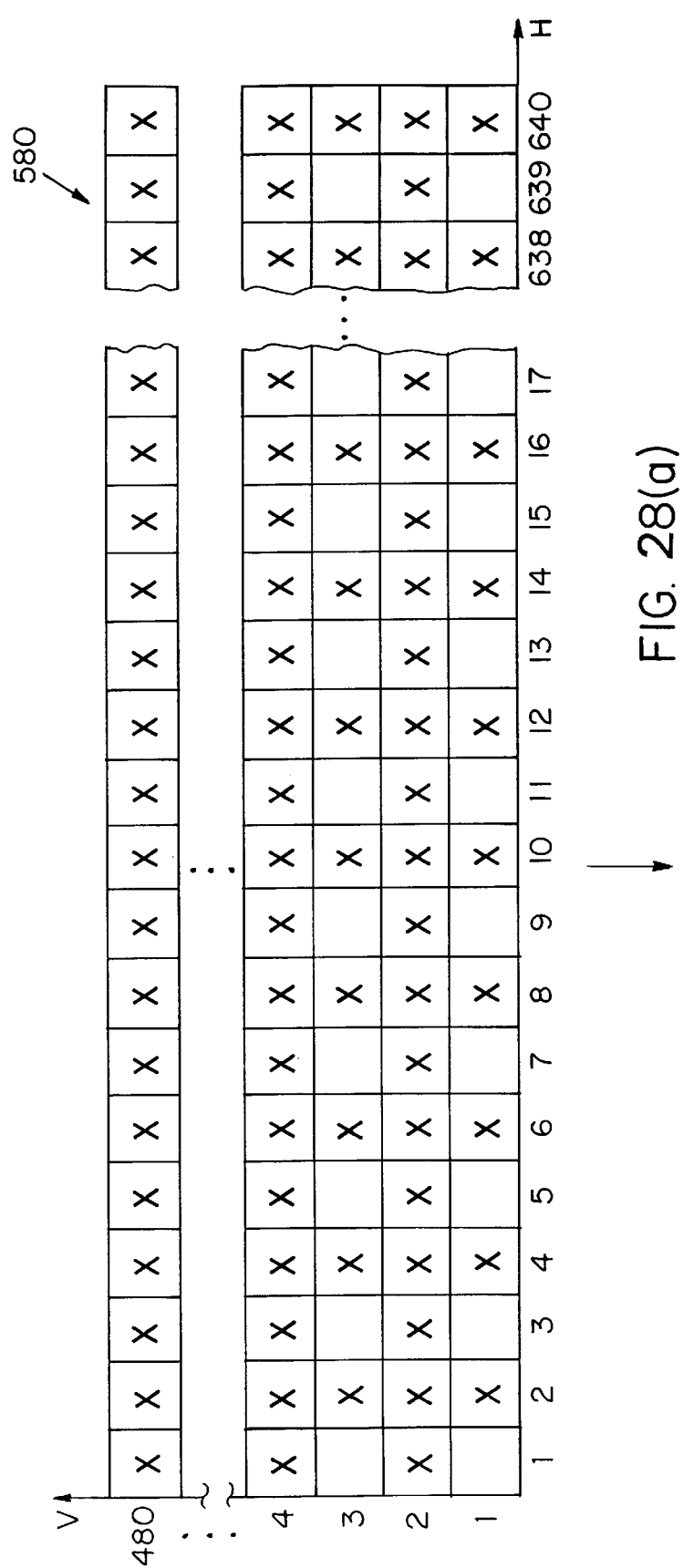
FIGS. 28(a)–28(c) show the compression and reconstruction of a frame of video data using the pixel decimation and replication technique of FIG. 27.
Figure 28B:
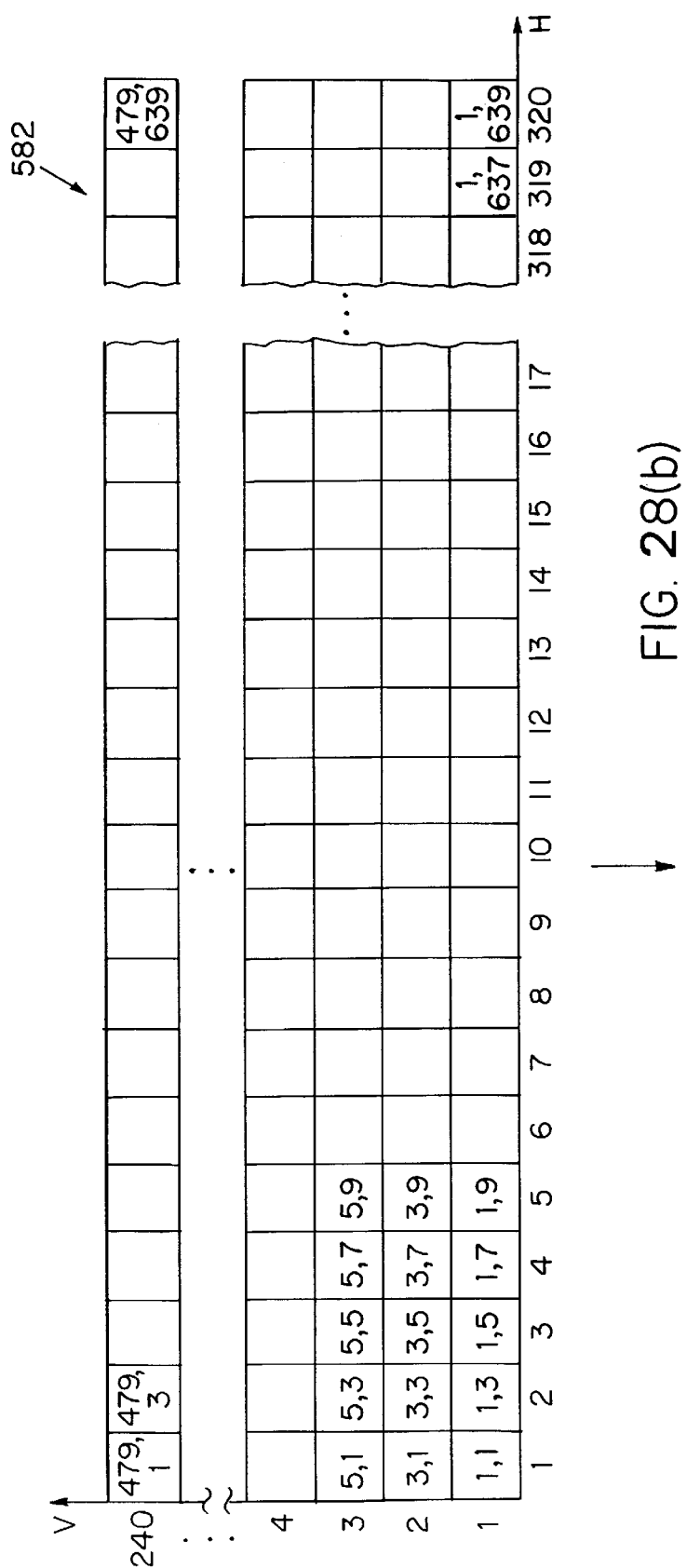

In its simplest form, the scaling can be accomplished by discarding every other pixel along a horizontal line, and every other entire horizontal line. FIG. 28(a) show a pictorial representation of a video frame 580 measuring 480 vertical (V) pixels by 680 horizontal (H) pixels. An "X" in the pixel indicates that it is eliminated from the video frame. The resulting scaled video frame 582 is shown in FIG. 28(b) and has 240 vertical pixels by 320 horizontal pixels, or ¼ the quantity of original pixels.

Figure 28C:
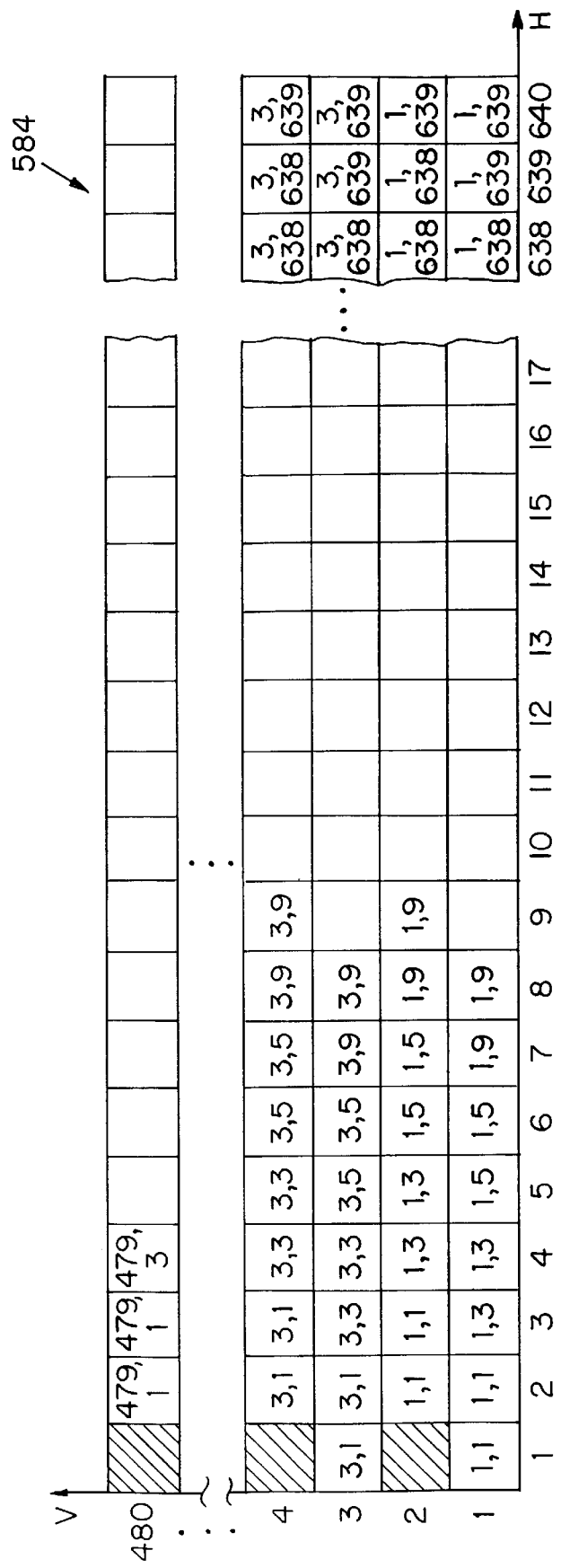

The resulting scaled video frame 582 is then made available to the DECspin application for transmission 554 across the network to a remote workstation. The remote workstation receives 556 the scaled video frame with a DECspind application. The DECspind application proceeds to reconstruct a 480 by 640 pixel video frame 584 as shown in FIG. 28(*c*) from the received scaled video frame. First the DECspind application replicates each scaled pixel along a horizontal line to produce 640 pixels along a line. For instance, the (1,1) pixel of the original unscaled video frame 580 of FIG. 28(*a*), where the notation is given as (V,H), is relocated to the (1,1) position and replicated to the (1,2) position of the reconstructed video frame 584 of FIG. 28(*c*). Similarly, the (1,3) pixel of the original frame 580 is relocated to the (1,3) position and replicated to the (1,4) position of the reconstructed frame 584.

Next, when an entire line of pixels has been reconstructed, that line is replicated 560, shifted 562 by one pixel and stored as the next adjacent vertical line in the reconstructed video frame. For example, as shown in FIG. 28(*c*), the reconstructed pixels from the first horizontal line (V=1) are replicated to the second horizontal line (V=2) and shifted by 1 pixel to the right. Thus, for example pixel (1,1) of the original video frame 580 is replicated into positions (2,2) and (2,3) of the reconstructed video frame 584, and pixel (1,3) of the original video frame 580 is replicated into positions (2,4) and (2,5) of the reconstructed video frame 584. It should be noted that the pixel on the left end of a replicated line (V=2) can be left blank (black), filled with a pre-determined color or grey level, or filled with yet another replication of the next adjacent pixel. On the other hand, the last pixel on a replicated line will only be reproduced once. These results will be reversed if the replicated line is shifted to the left by one pixel, rather than to the right as assumed in the above example.

Finally, the pixel and line replication process is repeated 566 for each line of scaled video data received by the DECspind application. When the DECspind application is done 564 reconstructing the entire scaled video frame, the reconstructed frame is made available for display 568 by the DECspind application. It should be noted that an analogous reconstruction technique that replicates pixels along a vertical column as just described for pixels along a horizontal line, and replicates and shifts vertical pixel columns as just described for horizontal lines, produces similar results. The DECspind application displays the reconstructed video frame in a DECspind application window synchronized to the audio data stream in a manner described above.

Equivalents

While this invention has been particularly shown and described with references to preferred embodiments thereof, it will be understood by those skilled in the art that various changes in form and details may be made therein without departing from the spirit and scope of the invention as defined by the appended claims. For example, although the audiovisual help documentation features of this invention have been described with reference to a video teleconferencing application, these help features are not limited to video teleconferencing applications. Rather, they can be used with a wide range of applications running on a multimedia workstation or personal computer.

What is claimed is:

1. A multimedia documentation apparatus for a multimedia computer workstation, comprising
   means for displaying a documentation menu on the workstation display, the documentation menu comprising
   a) a topic field for indicating a topic for which documentation is available;
   b) a first user selectable function associated with the topic field; and
   c) a second user selectable function associated with the topic field;
   a data file accessible by the computer workstation that contains both digitized audio and video documentation stored as separate serial packets, the audio and video documentation being help information describing an operation of the multimedia computer workstation relative to the topic;
   retrieval means for retrieval and playback by the workstation of video and audio documentation in the data file in response to activation of the first user selectable function associated with the topic field; and
   text retrieval means for retrieval and display by the workstation of textual documentation in response to activation of the second user selectable function associated with the topic field, the documentation being help information describing an operation of the multimedia computer workstation relative to the associated topic.

2. The multimedia documentation apparatus of claim 1, wherein the documentation menu comprises a pop-up window of a graphical user interface, and the user selectable function is represented as a graphical pushbutton.

3. The multimedia documentation apparatus of claim 2, wherein the first and second user selectable functions are selectable with a graphical pointing device.

4. The multimedia documentation apparatus of claim 3, wherein the pointing device is a mouse.

5. The multimedia documentation apparatus of claim 3, wherein the pointing device is a touch screen display.

6. The multimedia documentation apparatus of claim 2, wherein the documentation menu is an X Windows application.

7. The multimedia documentation apparatus of claim 6, wherein the windows are managed by a Motif X Windows manager.

8. The multimedia documentation apparatus of claim 1, the documentation menu further comprising
   a) a plurality of topic fields for indicating the identification of a plurality of topics for which documentation is available;
      data files accessible by the computer workstation, each data file containing both digitized audio and video documentation stored as separate serial packets, the audio and video documentation being help information describing an operation of the multimedia computer workstation relative to a corresponding one of the topics;
   b) a plurality of first user selectable functions each associated with a topic field the activation of which causes the retrieval means to retrieve and playback video and audio documentation related to the associated topic from the corresponding one of the data files; and
   c) a plurality of second user selectable functions each associated with a topic field the activation of which causes the text retrieval means to retrieve and display textual documentation related to the associated topic.

9. The multimedia documentation apparatus of claim 1, wherein the retrieval means comprises a retrieval application executing on a processor of the workstation.

10. The multimedia documentation apparatus of claim 1, wherein
    a) audio documentation related to the associated topic is stored in the multimedia data file as an audio data stream which can be retrieved from the data file and played back by the retrieval means as a continuous audio signal, and b) video documentation related to the associated topic is stored in the multimedia data file such that each frame of video data stored in the data file is inserted into the audio data stream also stored in the data file without affecting the continuity of the audio signal retrieved from the data file and played back by the retrieval means.

11. The multimedia documentation apparatus of claim 10, wherein a) video documentation related to the associated topic is stored in the multimedia data file including timing information attached to each frame of video data indicating a point in the audio data stream also stored to the data file which corresponds in time to the frame of video data; and b) the retrieval means further comprises synchronization means for delaying a display of a frame of video data, retrieved from the data file, on the display of the workstation until the point in the audio data stream, retrieved from the data file, corresponding to the timing information of the retrieved video frame is audibly reproduced by the workstation.

12. The multimedia documentation apparatus of claim 11, wherein a) the retrieval means further comprises timing means for generating timing information by counting the audio data in the audio stream retrieved from the multimedia data file; and b) the synchronization means further comprises comparison means for comparing the internally generated timing information with the timing information stored in the data file corresponding to the frame of video data most recently retrieved from the data file to determine when to display the most recently retrieved frame of video data on the display of the workstation.

13. A multimedia documentation system for a video teleconferencing workstation, comprising:

a video teleconference application window on the workstation display, the application window comprising:
 a video image area for displaying video information associated with a video teleconferencing session, and
 a control area for displaying one or more selectable video teleconferencing functions including a video teleconference documentation function;

a documentation menu window displayed on the workstation display in response to selection of the video teleconference documentation function for providing information regarding video teleconference documentation offered by the system, the documentation menu window comprising:
 a) at least one topic field for indicating a topic for which documentation is available, and
 b) a user selectable function associated with the topic field;

a data file, associated with each topic and accessible by the computer workstation, containing digitally encoded video and audio providing information concerning the topic field; and a retrieval program executing on the workstation for reproducing the digitally encoded video and audio stored as separate serial packets in the data file in response to activation of the user selectable function.

14. The system of claim 13, wherein the user selectable function is selectable with a graphical pointing device.

15. The system of claim 14, wherein the pointing device is a mouse.

16. The system of claim 14, wherein the pointing device is a touch screen display.

17. The system of claim 13, wherein the documentation menu is an X Windows application.

18. The system of claim 17, wherein the windows are managed by a Motif X Windows manager.

19. The system of claim 13, the documentation menu further comprising a) a plurality of topic fields for indicating the identification of a plurality of topics for which documentation is available, and b) a plurality of user selectable functions each associated with a topic field the activation of which causes the retrieval program to retrieve and playback digitally encoded video and audio documentation related to the associated topic.

20. The system of claim 19, further comprising a different multimedia data file associated with each topic field for storing digitally encoded video and audio providing information concerning the topic field that is associated with the multimedia data file.

21. The system of claim 20, wherein a) the digitally encoded audio related to the associated topic is stored in the multimedia data file as an audio data stream which can be retrieved from the data file and played back by the retrieval program as a continuous audio signal, and b) the digitally encoded video related to the associated topic is stored in the multimedia data file such that each frame of video data stored in the data file is inserted into the audio data stream also stored in the data file without affecting the continuity of the audio signal retrieved from the data file and played back by the retrieval program.

22. The system of claim 21, wherein a) timing information is attached to frames of the video data indicating a point in the audio data stream also stored to the data file which corresponds in time to the frames of video data; and b) the retrieval program displays a frame of video data, retrieved from the data file, on the display of the workstation in response to the reproduction of a point in the audio data stream, retrieved from the data file, corresponding to the timing information of the retrieved video frame.

23. The system of claim 22 wherein the retrieval program internally generates timing information by counting the amount of audio data in the audio stream retrieved from the multimedia data file and compares the internally generated timing information with the timing information stored in the data file corresponding to the frame of video data most recently retrieved from the data file to determine when to display the most recently retrieved frame of video data on the display of the workstation.

24. The system of claim 13, wherein the documentation menu window further comprises, a second user selectable function associated with the topic field; and the system further comprises a text retrieval program for retrieval and display by the workstation of textual documentation, related to the associated topic, upon activation of the second user selectable function associated with the topic field.

25. The system of claim 24, wherein the documentation menu window further comprises
   a) a plurality of topic fields for indicating the identification of a plurality of topics for which documentation is available,
   b) a plurality of user selectable functions each associated with a topic field the activation of which causes the retrieval program to retrieve and playback video and audio documentation related to the associated topic, and
   c) a plurality of second user selectable functions each associated with a topic field the activation of which causes the text retrieval program to retrieve and display textual documentation related to the associated topic.

26. The system of claim 13, further comprising a hard drive for storing the data file.

27. The system of claim 26, wherein the hard drive is located on the workstation.

28. The system of claim 19, wherein a different data file is associated with each topic.

* * * * *